United States Patent
Chung et al.

(10) Patent No.: US 10,146,985 B2
(45) Date of Patent: Dec. 4, 2018

(54) ANALOG FRONT END CIRCUIT FOR USE WITH FINGERPRINT SENSOR, AND DEVICE HAVING THE SAME

(71) Applicant: SAMSUNG ELECTRONICS CO., LTD., Suwon-si, Gyeonggi-Do (KR)

(72) Inventors: Dae Young Chung, Seoul (KR); Jae Jin Park, Seongnam-si (KR); Hee Chang Hwang, Seoul (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 102 days.

(21) Appl. No.: 15/438,463

(22) Filed: Feb. 21, 2017

(65) Prior Publication Data
US 2018/0039809 A1    Feb. 8, 2018

(30) Foreign Application Priority Data
Aug. 2, 2016    (KR) .......................... 10-2016-0098605

(51) Int. Cl.
*G06K 9/00* (2006.01)
(52) U.S. Cl.
CPC ....... *G06K 9/0002* (2013.01); *G06K 9/00013* (2013.01); *G06K 9/00046* (2013.01)
(58) Field of Classification Search
CPC ........... G06K 9/00013; G06K 9/00046; G06K 9/00006; G06K 9/0002
See application file for complete search history.

(56) References Cited

U.S. PATENT DOCUMENTS

| | | | |
|---|---|---|---|
| 6,049,620 A | 4/2000 | Dickinson et al. | |
| 6,259,804 B1 * | 7/2001 | Setlak | G06K 9/0002 382/124 |
| 7,099,496 B2 | 8/2006 | Benkley, III | |
| 7,146,024 B2 | 12/2006 | Benkley, III | |
| 7,460,697 B2 * | 12/2008 | Erhart | G06K 9/00026 324/661 |
| 7,616,786 B2 | 11/2009 | Setlak | |
| 7,868,874 B2 | 1/2011 | Reynolds | |

(Continued)

FOREIGN PATENT DOCUMENTS

KR    10-2006-0087704    8/2006

*Primary Examiner* — Utpal Shah
(74) *Attorney, Agent, or Firm* — F. Chau & Associates, LLC

(57) ABSTRACT

A sensing read-out circuit includes an amplifier circuit that converts a charge output from a sensing line of a sensor into a first voltage, another amplifier circuit that converts a charge output from another sensing line into a second voltage, another amplifier circuit that generates a first amplified voltage by amplifying a difference between the first voltage and the second voltage, an analog-to-digital converter that converts the first amplified voltage into a digital signal, a first mixer that generates a second mixed signal by mixing the first digital signal and an in-phase clock signal, a second mixer that generates a second mixed signal by mixing the first digital signal and a quadrature-phase clock signal, a first filter that generates an in-phase signal by performing low-pass filtering on the first mixed signal, and a second filter that generates a quadrature-phase signal by performing low-pass filtering on the second mixed signal.

20 Claims, 18 Drawing Sheets

(56) References Cited

U.S. PATENT DOCUMENTS

| | | | |
|---|---|---|---|
| 8,743,080 B2* | 6/2014 | Hargreaves | G08C 19/12 |
| | | | 345/174 |
| 8,766,949 B2* | 7/2014 | Schwartz | G06F 3/044 |
| | | | 178/18.06 |
| 8,787,632 B2 | 7/2014 | Dean et al. | |
| RE45,601 E * | 7/2015 | Dean | G06K 9/0002 |
| 9,893,721 B2* | 2/2018 | Lee | H03K 5/1534 |
| 2009/0256733 A1* | 10/2009 | Kim | H03M 1/002 |
| | | | 341/136 |
| 2013/0211757 A1* | 8/2013 | Miyamoto | G06F 3/0416 |
| | | | 702/65 |
| 2013/0279769 A1* | 10/2013 | Benkley, III | G06K 9/00013 |
| | | | 382/124 |
| 2014/0212009 A1 | 7/2014 | Benkley, III et al. | |
| 2014/0300574 A1 | 10/2014 | Benkley, III et al. | |
| 2014/0355376 A1* | 12/2014 | Schneider | G01S 7/56 |
| | | | 367/7 |
| 2015/0138145 A1* | 5/2015 | Hwang | G06F 3/0418 |
| | | | 345/174 |
| 2015/0177884 A1 | 6/2015 | Han | |
| 2015/0242672 A1 | 8/2015 | Benkley, III et al. | |
| 2016/0180619 A1* | 6/2016 | Riedijk | G07C 9/00158 |
| | | | 324/679 |
| 2017/0090028 A1* | 3/2017 | Djordjev | G01S 15/89 |
| 2017/0308730 A1* | 10/2017 | Sundblad | G06K 9/0002 |
| 2018/0005004 A1* | 1/2018 | Du | G06F 3/0416 |
| 2018/0068155 A1* | 3/2018 | Call | A61B 8/06 |

* cited by examiner

| Switches \ Mode | TX-to-RX | RX-to-TX |
|---|---|---|
| 260T | OFF | ON |
| 260R | ON | OFF |

ANALOG FRONT END CIRCUIT FOR USE WITH FINGERPRINT SENSOR, AND DEVICE HAVING THE SAME

CROSS-REFERENCE TO RELATED APPLICATIONS

This application claims priority under 35 U.S.C. § 119 to Korean Patent Application No. 10-2016-0098605 filed on Aug. 2, 2016, the disclosure of which is hereby incorporated by reference in its entirety.

TECHNICAL FIELD

Exemplary embodiments of the present inventive concept relate to an analog front end circuit, and more particularly, to an analog front end circuit for reading out output signals of an on-display fingerprint sensor, and a device having the same.

DISCUSSION OF THE RELATED ART

Fingerprint recognition and authentication is a field of biometrics technology in which a user is recognized and authenticated by acquiring a digital image of a fingerprint using a fingerprint sensor. The fingerprint sensor is an electronic device used to capture an image of a fingerprint pattern of a user.

Optical, ultrasonic, and capacitance recognition techniques are examples of techniques used for fingerprint authentication. Optical fingerprint recognition includes acquiring a fingerprint image reflected using visible light, ultrasonic fingerprint recognition includes acquiring a fingerprint image using an ultrasound test principle, and capacitive fingerprint recognition includes acquiring a fingerprint image using a difference in capacitance.

A smartphone typically includes a locking function, and a fingerprint sensor may be used to unlock the smartphone. The fingerprint sensor of the smartphone may be placed on a home button positioned, for example, near the center of the bottom on a front side of the smartphone, or on a backside of the smartphone.

SUMMARY

According to an exemplary embodiment of the present inventive concept, a sensor read-out circuit includes a first amplifier circuit that converts a first charge output from a first sensing line of a sensor into a first voltage, a second amplifier circuit that converts a second charge output from a second sensing line of the sensor into a second voltage, a third amplifier circuit that generates a first amplified voltage by amplifying a difference between the first voltage and the second voltage, a first analog-to-digital converter that converts the first amplified voltage into a first digital signal, a first mixer that generates a first mixed signal by mixing the first digital signal and an in-phase clock signal, a second mixer that generates a second mixed signal by mixing the first digital signal and a quadrature-phase clock signal, a first filter that generates a first in-phase signal by performing low-pass filtering on the first mixed signal, and a second filter that generates a first quadrature-phase signal by performing low-pass filtering on the second mixed signal.

According to an exemplary embodiment of the present inventive concept, a sensor read-out circuit includes an analog circuit that converts and amplifies a difference between a first mutual capacitance value of a first sensing line connected to a sensor and a second mutual capacitance value of a second sensing line connected to the sensor, and generates a band-pass filtered voltage by performing band-pass filtering on an amplified voltage. The sensor read-out circuit further includes an analog-to-digital converter that converts the band-pass filtered voltage into a digital signal, a first mixer that generates a first mixed signal by mixing the digital signal and an in-phase signal, a second mixer that generates a second mixed signal by mixing the digital signal and a quadrature-phase clock signal, a first filter that generates an in-phase signal by performing low-pass filtering on the first mixed signal, and a second filter that generates a quadrature-phase signal by performing low-pass filtering on the second mixed signal.

According to an exemplary embodiment of the present inventive concept, a fingerprint sensing system includes a fingerprint sensor, and a sensor read-out circuit that reads out output signals of the fingerprint sensor. The fingerprint sensor includes a first sensing element connected between a drive line and a first sensing line, a second sensing element connected between the drive line and a second sensing line, and a third sensing element connected between the drive line and a third sensing line. The sensor read-out circuit includes a first amplifier circuit that converts a first charge output from the first sensing line into a first voltage, a second amplifier circuit that converts a second charge output from the second sensing line into a second voltage, a third amplifier circuit that generates a first amplified voltage by amplifying a difference between the first voltage and the second voltage, a first analog-to-digital converter that converts the first amplified voltage into a first digital signal, a first mixer that generates a first mixed signal by mixing the first digital signal and an in-phase clock signal, a second mixer that generates a second mixed signal by mixing the first digital signal and a quadrature-phase clock signal, a first filter that generates a first in-phase signal by performing low-pass filtering on the first mixed signal, and a second filter that generates a first quadrature-phase signal by performing low-pass filtering on the second mixed signal.

According to an exemplary embodiment of the present inventive concept, a method of operating a sensor read-out circuit includes converting a first charge output from a first sensing line of a sensor into a first voltage, converting a second charge output from a second sensing line of the sensor into a second voltage, generating a first amplified voltage by amplifying a difference between the first voltage and the second voltage, converting the first amplified voltage into a first digital signal, generating a first mixed signal by mixing the first digital signal and an in-phase clock signal, generating a second mixed signal by mixing the first digital signal and a quadrature-phase clock signal, generating a first in-phase signal by performing low-pass filtering on the first mixed signal, and generating a first quadrature-phase signal by performing low-pass filtering on the second mixed signal.

BRIEF DESCRIPTION OF THE DRAWINGS

The above and other features of the present inventive concept will become apparent by describing in detail exemplary embodiments thereof with reference to the accompanying drawings, in which.

DETAILED DESCRIPTION OF THE EXEMPLARY EMBODIMENTS

Figure 1:
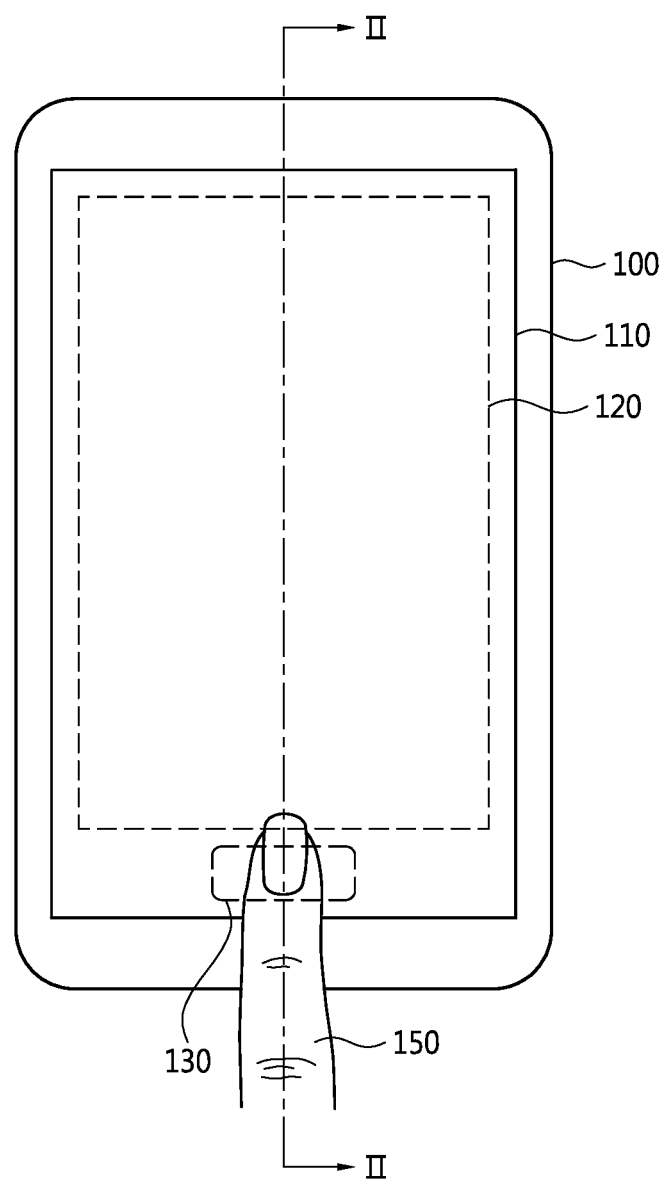
FIG. 1 is a perspective view of a mobile device including an analog front end circuit for reading out output signals of an on-display fingerprint sensor array, according to an exemplary embodiment of the present inventive concept.

Exemplary embodiments of the present inventive concept will be described more fully hereinafter with reference to the accompanying drawings. Like reference numerals may refer to like elements throughout the accompanying drawings.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

Herein, when events are described as occurring at substantially the same time or substantially simultaneously, it is to be understood that the events may occur at exactly the same time or at about the same time as would be understood by a person having ordinary skill in the art.

FIG. 1 is a perspective view of a mobile device including an analog front end (AFE) circuit for reading out output signals of an on-display fingerprint sensor array, according to an exemplary embodiment of the present inventive concept. The AFE circuit may also be referred to as a sensor read-out circuit or a sensor read-out AFE circuit, and may be embodied as a semiconductor chip.

A mobile device 100 (also referred to as a fingerprint sensing system) shown in FIG. 1 may include a cover glass (also referred to as a glass display) 110, a touch sensor (also referred to as a touch sensor region) 120, and a fingerprint sensor (also referred to as a fingerprint sensor region) 130. The mobile device 100 may be embodied as, for example, a smartphone, a tablet PC, an Internet of Things (IoT) device, an Internet of Everything (IoE) device, or a wearable computer. However, the mobile device 100 is not limited thereto.

In an exemplary embodiment, the touch sensor 120 includes a touch sensor array including a plurality of touch sensing elements. The fingerprint sensor 130 includes a fingerprint sensor array including a plurality of fingerprint sensing elements. The plurality of fingerprint sensing elements generates signals related to a fingerprint of a finger positioned on the fingerprint sensor. A magnitude of each of the plurality of touch sensing elements may be larger than a magnitude of each of the plurality of fingerprint sensing elements. Each of the plurality of touch sensing elements and each of the plurality of fingerprint sensing elements may be, for example, a capacitive sensing element. A sensing element may be referred to herein as a pixel or a sensor pixel.

Figure 2:
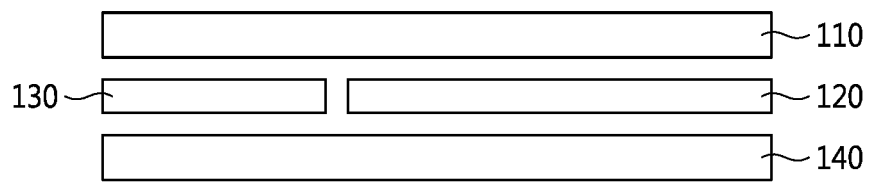
FIG. 2 is a cross-sectional view of the mobile device of FIG. 1 taken along line II-II according to an exemplary embodiment of the present inventive concept.

FIG. 2 is a cross-sectional view of the mobile device of FIG. 1 taken along line II-II according to an exemplary embodiment of the inventive concept. Referring to FIGS. 1 and 2, in an exemplary embodiment, the touch sensor 120 and the fingerprint sensor 130 are disposed underneath the cover glass 110, and a display panel 140 is disposed underneath the touch sensor 120 and the fingerprint sensor 130. The touch sensor 120 and the fingerprint sensor 130 are formed of transparent substances, which allows light output from light sources disposed on the display panel 140 to pass therethrough.

Figure 3:
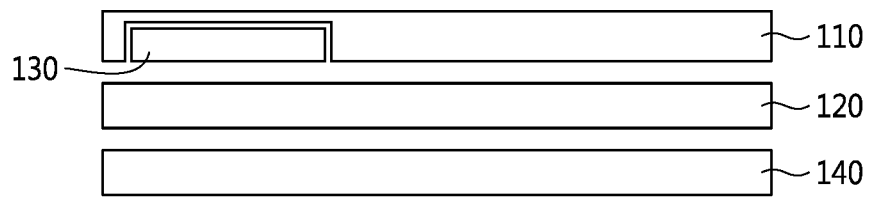
FIG. 3 is a sectional view of the mobile device of FIG. 1 taken along line II-II according to an exemplary embodiment of the present inventive concept.

FIG. 3 is a cross-sectional view of the mobile device of FIG. 1 taken along line II-II according to an exemplary embodiment of the inventive concept. Referring to FIGS. 1 and 3, in an exemplary embodiment, the fingerprint sensor 130 is disposed in the cover glass 110.

Figure 4:
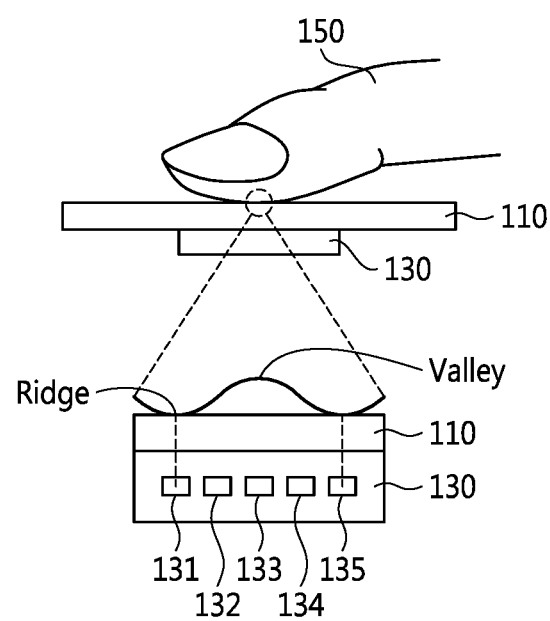
FIG. 4 shows a finger in contact with a cover glass of the mobile device of FIG. 1.

FIG. 4 shows a finger when the finger is in contact with the cover glass of the mobile device. A fingerprint pattern on the finger includes ridges and valleys.

In a state in which the finger 150 is in contact with the cover glass 110, the amount of charges which exit through a capacitor formed towards the finger 140 from ridges of a fingerprint is larger than the amount of charges which exit through a capacitor formed towards the finger 140 from a valley of the fingerprint. Thus, a difference in the amount of charges occurs similar to the occurrence of a difference in mutual capacitance. A sensor read-out circuit according to an exemplary embodiment of the present inventive concept uses a differential sensing technique (also referred to as a differential measurement technique) to amplify the difference. For example, a value of mutual capacitance at ridges of a fingerprint is relatively small compared to a value of mutual capacitance at a valley of the fingerprint. Further, a change in the amount of charges at ridges of a fingerprint is relatively large compared to a change in the amount of charges at a valley of the fingerprint.

Figure 5:
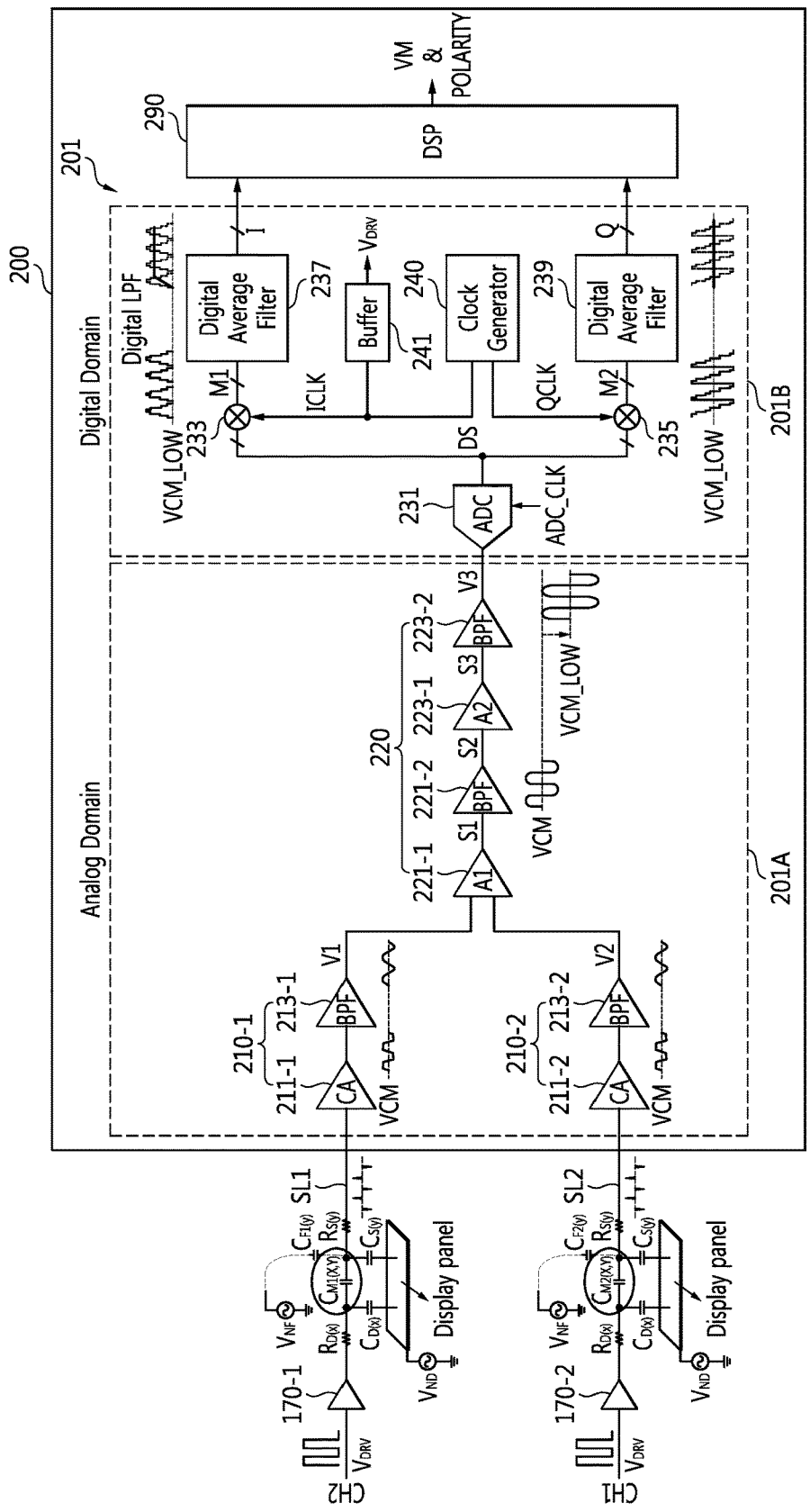
FIG. 5 is a schematic block diagram of an analog front end circuit implementing digital lock-in amplifier technology according to an exemplary embodiment of the present inventive concept.

FIG. 5 is a schematic block diagram of an analog front end (AFE) circuit implementing digital lock-in amplifier technology according to an exemplary embodiment of the present inventive concept. A lock-in amplifier is an amplifier having both an amplification function and a specific signal detection function. The lock-in amplifier may sense and amplify a signal with a specific frequency. The lock-in amplifier is a type of amplifier that extracts a signal with a known carrier wave from a noisy environment. Each of the components shown in FIG. 5 may be implemented by a circuit configured to perform the corresponding task.

In an exemplary embodiment, the AFE circuit 200 includes an I/Q generator 201. In an exemplary embodiment, a digital signal processor (DSP) 290 is included in the AFE circuit 200, as shown in FIG. 5. However, exemplary embodiments are not limited thereto. For example, in an exemplary embodiment, the DSP 290 may be disposed outside of the AFE circuit 200. The I/Q generator 201 may include an analog domain (also referred to as an analog circuit) 201A and a digital domain (also referred to as a digital circuit) 201B. For convenience of explanation, configurations for describing a differential sensing technique between two sensing lines SL1 and SL2 are exemplarily shown in FIG. 5.

Figure 8:
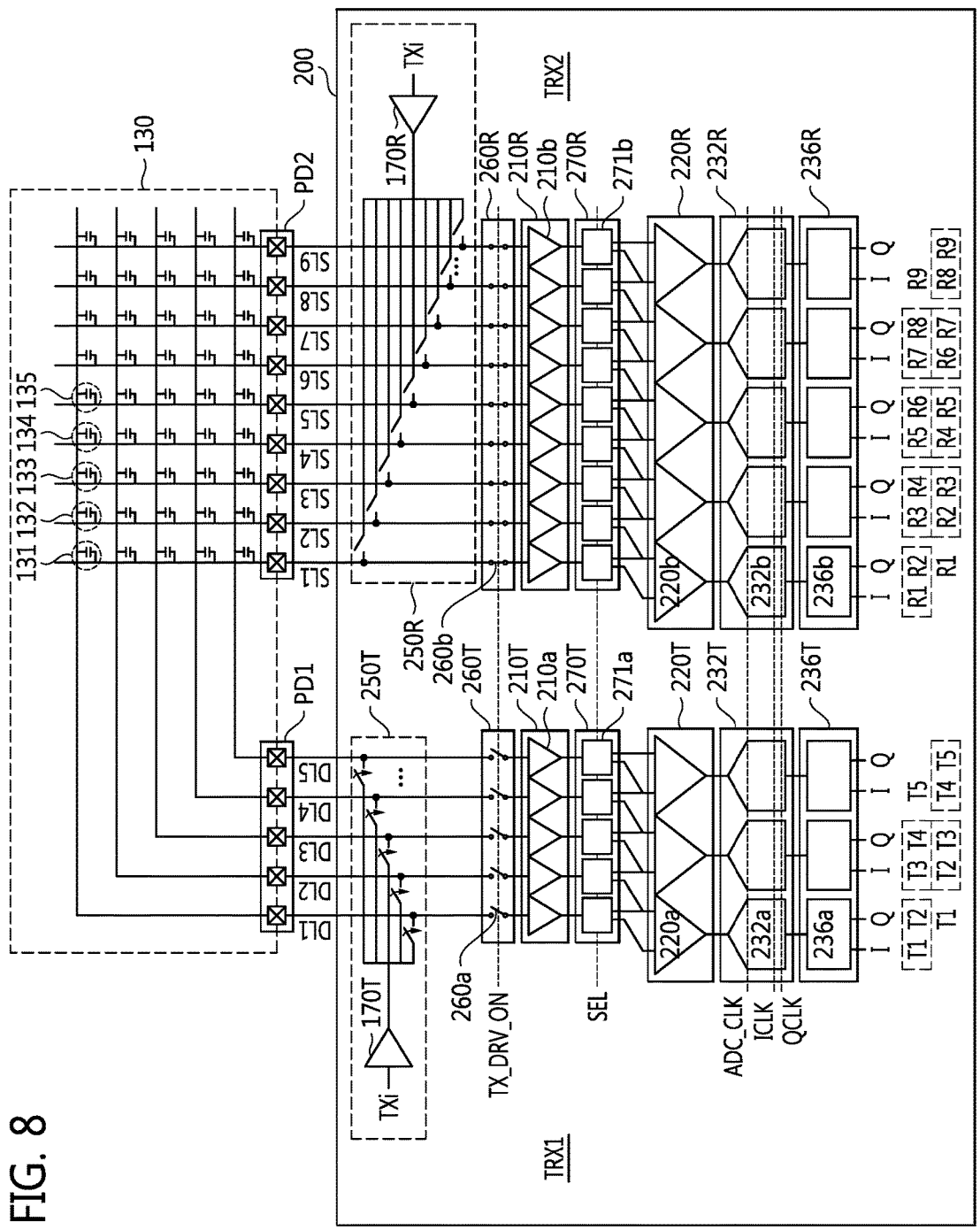
FIG. 8 shows a detailed structure of the analog front end circuit shown in FIG. 5 according to an exemplary embodiment of the present inventive concept.

Referring to FIG. 5, in an exemplary embodiment, a first fingerprint sensor 131 is connected to a first sensing line SL and a first drive line DL1, and a second fingerprint sensor 132 is connected to a second sensing line SL2 and the first drive line DL1 (see FIG. 8). It is assumed that the finger 150 touches the cover glass 110 disposed on the first fingerprint sensor 131 and the second fingerprint sensor 132.

$V_{NF}$ represents an external noise source, $C_{F1(y)}$ represents a capacitance (also referred to as a self-parasitic capacitance) of the finger 150 for the first fingerprint sensor 131, $C_{F2(y)}$ represents a capacitance (also referred to as a self-parasitic capacitance) of the finger 150 for the second fingerprint sensor 132, $R_{D(x)}$ represents resistance between a drive line DL1 or DL2 and a fingerprint sensor 131 or 132, $R_{S(y)}$ represents resistance between the fingerprint sensor 131 or 132 and a sensing line SL1 or SL2, $C_{D(x)}$ represents a capacitance between the drive line DL1 or DL2 and the fingerprint sensor 131 or 132, $C_{S(y)}$ represents a capacitance between the fingerprint sensor 131 or 132 and the sensing line SL1 or SL2, $V_{ND}$ represents a noise source of a display panel, $C_{M1(X,Y)}$ represents mutual capacitance between the first fingerprint sensor 131 and surrounding fingerprint sensors, and $C_{M2(X,Y)}$ represents mutual capacitance between the second fingerprint sensor 132 and surrounding fingerprint sensors. Each of drivers 170-1 and 170-2 supply each drive pulse $V_{DRV}$ to each of the sensing lines SL1 and SL2. Each of channels CH1 and CH2 refer to each of the sensing lines SL and SL2.

In an exemplary embodiment, the analog domain 201A includes a first amplifier circuit 210-1, a second amplifier circuit 210-2, and a third amplifier circuit 220. The analog domain 201A converts and amplifies a difference between a first mutual capacitance value of the first sensing line SL1 connected to the fingerprint sensor 130 and a second mutual capacitance value of the second sensing line SL2 connected to the fingerprint sensor 130, and generates a band-pass filtered voltage V3 by performing band-pass filtering on an amplified voltage.

The first amplifier circuit 210-1 converts (amplifies) a first charge (charges) output from the first sensing line SL1 of the fingerprint sensor 130 into the first voltage V1. The first amplifier circuit 210-1 includes a first charge amplifier 211-1 that amplifies the first charge, and a first band-pass filter 213-1 connected to an output terminal of the first charge amplifier 211-1. The first band-pass filter 213-1 outputs the first voltage V1. The first charge is a charge related to the first mutual capacitance value.

The second amplifier circuit 210-2 converts (amplifies) a second charge (charges) output from the second sensing line SL2 of the fingerprint sensor 130 into a second voltage V2. The second amplifier circuit 210-2 includes a second charge amplifier 211-2 that amplifies the second charge, and a second band-pass filter 213-2 connected to an output terminal of the second charge amplifier 211-2. The second band-pass filter 213-2 outputs the second voltage V2. The second charge is a charge related to the second mutual capacitance value.

Each of the band-pass filters 213-1 and 213-2 may remove noises of the display panel 140 or external noises, and may deliver a signal with an operating frequency component to the third amplifier circuit 220. VCM represents a common mode voltage. Although the exemplary embodiment shown in FIG. 5 includes the band-pass filters 213-1 and 213-2, exemplary embodiments are not limited thereto. For example, according to exemplary embodiments, the analog domain 201A does not include the band-pass filters 213-1 and 213-2.

The third amplifier circuit 220 amplifies a difference between the first voltage V1 of the first amplifier circuit 210-1 and the second voltage V2 of the second amplifier circuit 210-2, and generates a first amplified voltage V3. In an exemplary embodiment, the third amplifier circuit 220 includes a first amplifier 221-1, a third band-pass filter 221-2, a second amplifier 223-1, and a fourth band-pass filter 223-2.

The first amplifier 221-1 amplifies the difference between the first voltage V1 and the second voltage V2. The first amplifier 221-1 refers to a differential-to-single gain amplifier. The third band-pass filter 221-2 is connected to the output terminal of the first amplifier 221-1 and performs band-pass filtering on the output signal S of the first amplifier 221-1. The second amplifier 223-1 receives and amplifies the output signal S2 of the third band-pass filter 221-2.

The fourth band-pass filter 223-2 receives an output signal S3 of the second amplifier 223-1, performs band-pass filtering thereon, and generates the band-pass filtered voltage V3.

The fourth band-pass filter 223-2 may shift down a level of the common mode voltage VCM, and generate a shifted-down common mode voltage VCM_LOW to adjust the level of the common mode voltage VCM within an input range of the an analog-to-digital converter (ADC) 231 of the digital domain 201B. A signal-to-noise ratio (SNR) of each of the signals S2 and V3 may be improved by each of the band-pass filters 221-2 and 223-2. Although the third amplifier circuit 220 in the exemplary embodiment of FIG. 5 includes the third band-pass filter 221-2, exemplary embodiments are not limited thereto. For example, according to exemplary embodiments, the third amplifier circuit 220 does not include the third band-pass filter 221-2. Since the analog domain 201A uses a continuous circuit structure which does not have switching, switching noises are not generated.

In an exemplary embodiment, a level of a common mode voltage of the band-pass filter 223-2 is lower than a level of a common mode voltage of the band-pass filter 221-2.

The digital domain 201B may be embodied as, for example, a digital lock-in amplifier. The digital domain 201B may include the analog-to-digital converter (ADC) 231, a first mixer 233, a second mixer 235, a first digital average filter 237, a second digital average filter 239, a clock signal generator 240, and a buffer 241.

The ADC 231 converts an output signal (e.g., the first amplified voltage V3) output from the analog domain 201A into a digital signal DS using a sampling frequency (e.g., sampling clock signal ADC_CLK). The digital signal DS is transmitted (e.g., substantially simultaneously transmitted) to mixers 233 and 235 through different paths. Thus, an in-phase signal I and a quadrature-phase signal Q may be substantially simultaneously output through the digital average filters 237 and 239. Compared to a conventional method of processing a signal in a time multiplexing method through one channel (or digital average filter), time for each of the digital average filters 237 and 239 calculating an average value can be increased and a bandwidth of each of the digital average filters 237 and 239 can be reduced by about half.

In accordance with such a structure, the digital domain 201B can extract a difference in the amount of change of charges in small mutual capacitance from noises.

The first mixer 233 mixes the digital signal DS and an in-phase clock signal ICLK, and generates a first mixed signal M1. The second mixer 235 mixes the digital signal DS and a quadrature-phase clock signal QCLK, and generates a second mixed signal M2.

The first digital average filter 237 calculates an average value of the first mixed signal M1, and generates an in-phase signal I according to a result of the calculation. The first digital average filter 237 may be, for example, a low-pass filter, and the in-phase signal I may be, for example, a DC signal.

The second digital average filter 239 calculates an average value of the second mixed signal M2, and generates a quadrature-phase signal Q according to a result of the calculation. The second digital average filter 239 may be, for example, a low-pass filter, and the quadrature-phase signal Q may be, for example, a DC signal.

The clock signal generator 240 generates the in-phase clock signal ICLK and the quadrature-phase clock signal QCLK. A frequency of the in-phase clock signal ICLK is lower than the sampling frequency ADC_CLK.

The buffer 241 generates a drive pulse $V_{DRV}$ by buffering the in-phase clock signal ICLK, and transmits the drive pulse $V_{DRV}$ to a drive line. The buffer 241 may refer to, for example, each of the drivers 170-1 and 170-2.

The DSP 290 calculates a vector magnitude VM and a polarity using the in-phase signal I and the quadrature-phase signal Q. According to a calculated polarity, a polarity of an intermediate slope changing from a ridge to a valley or from a valley to a ridge may be determined. For example, a polarity may be determined by a sign of a cosine value or a sign of a value of the in-phase signal I.

Figure 6:
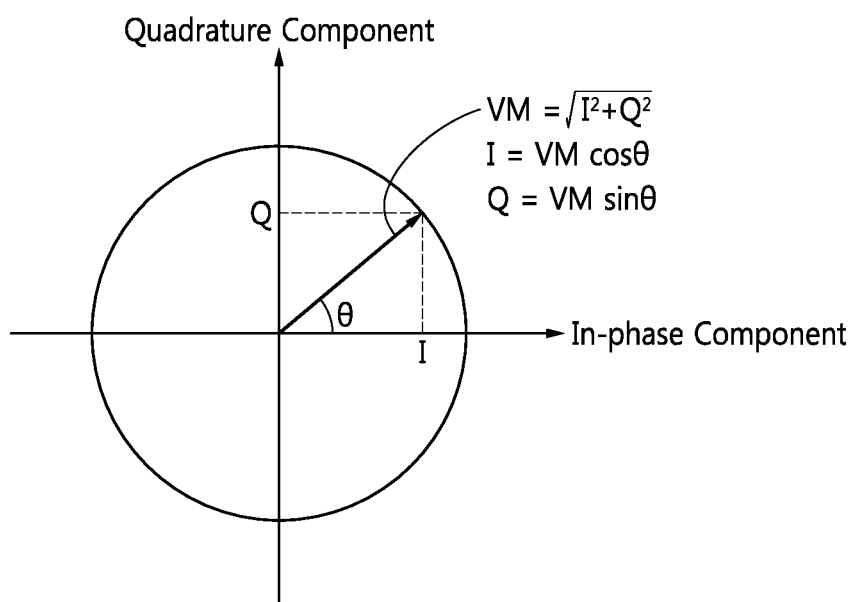
FIGS. 6 and 7 are conceptual diagrams illustrating a vector magnitude and a polarity output from a digital signal processor shown in FIG. 5 according to an exemplary embodiment of the present inventive concept.
Figure 7:
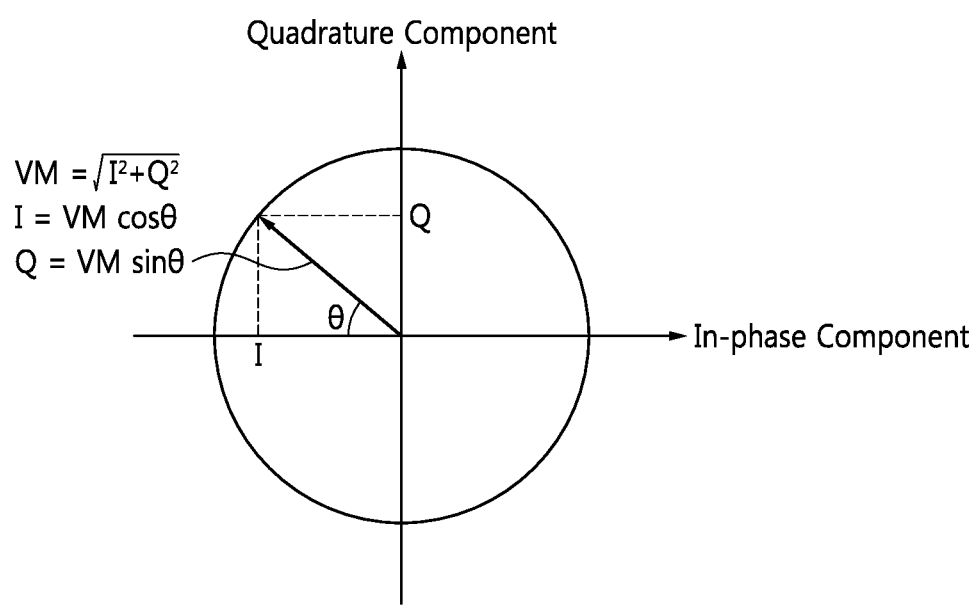

FIGS. 6 and 7 are conceptual diagrams illustrating a vector magnitude and a polarity output from the digital signal processor shown in FIG. 5 according to an exemplary embodiment of the inventive concept. Referring to FIGS. 5 to 7, a horizontal axis represents an in-phase component and a vertical axis represents a quadrature-phase component.

The DSP 290 determines a vector magnitude VM using a magnitude of the in-phase signal I and a magnitude of the quadrature-phase signal Q. The DSP further determines a polarity using the sign of a value of cos θ or the sign of a value of the in-phase signal I. For example, polarities in a first quadrant and a fourth quadrant are positive, and polarities in a second quadrant and a third quadrant are negative.

For example, when a phase θ is between about −90 degrees and about +90 degrees, a polarity is positive. When the polarity is positive, the DSP 290 determines a change from a ridge to a valley. When the polarity is negative, the DSP 290 determines a change from valleys to ridges.

FIG. 8 shows a detailed structure of the analog front end circuit shown in FIG. 5 according to an exemplary embodiment of the inventive concept. Referring to FIGS. 5 and 8, the AFE circuit 200 and the fingerprint sensor 130 are shown together. The AFE circuit 200 of FIG. 8 may use a two-dimensional column-parallel sensing method in which output signals of the fingerprint sensor 130 can be sensed in a transmit-to-receive mode or a receive-to-transmit mode. Each of the components shown in FIG. 8 may be implemented by a circuit configured to perform the corresponding task.

For example, in an exemplary embodiment, the AFE circuit 200 receives signals from the fingerprint sensor 130 k times in the transmit-to-receive mode, or m times in the receive-to-transmit mode, using a time multiplexing method for an odd-numbered differential pair or an even-numbered differential pair. k and m are natural numbers equal to at least 2. k and m may be the same as each other or different from each other.

The fingerprint sensor 130 includes a plurality of fingerprint sensors connected to a plurality of drive lines DL1 to DL5 and a plurality of sensing lines SL to SL9. Fingerprint sensors 131 to 135 of FIG. 8 correspond to the fingerprint sensors 131 to 135 of FIG. 4. For convenience of explanation, five drive lines DL1 to DL5 and nine sensing lines SL1 to SL9 are shown in FIG. 8, however, exemplary embodiments are not limited thereto.

The fingerprint sensor 130 and the AFE circuit 200 are electrically connected to each other through first pads PD1 and second pads PD2. The AFE circuit 200 may be embodied as an array structure.

In an exemplary embodiment, the AFE circuit 200 includes a first two-way circuit TRX1 and a second two-way circuit TRX2. The first two-way circuit TRX1 operates as a transmission circuit and the second two-way circuit TRX2 operates as a receiving circuit in the transmit-to-receive mode. The first two-way circuit TRX1 operates as the receiving circuit and the second two-way circuit TRX2 operates as the transmission circuit in the receive-to-transmit mode.

In an exemplary embodiment, the AFE circuit 200 includes a first switch circuit 250T, a second switch circuit 250R, a third switch circuit 260T, a fourth switch circuit 260R, a first circuit 210T, a second circuit 210R, a fifth switch circuit 270T, a sixth switch circuit 270R, a third circuit 220T, a fourth circuit 220R, a fifth circuit 232T, a sixth circuit 232R, a seventh circuit 236T, and an eighth circuit 236R.

The first two-way circuit TRX1 includes the first switch circuit 250T, the third switch circuit 260T, the first circuit 210T, the fifth switch circuit 270T, the third circuit 220T, the fifth circuit 232T, and the seventh circuit 236T. The second two-way circuit TRX2 includes the second switch circuit 250R, the fourth switch circuit 260R, the second circuit 210R, the sixth switch circuit 270R, the fourth circuit 220R, the sixth circuit 232R, and the eighth circuit 236R.

The first switch circuit 250T includes a first driver 170T and a plurality of first switches. The second switch circuit 250R includes a second driver 170R and a plurality of second switches.

Figure 9:
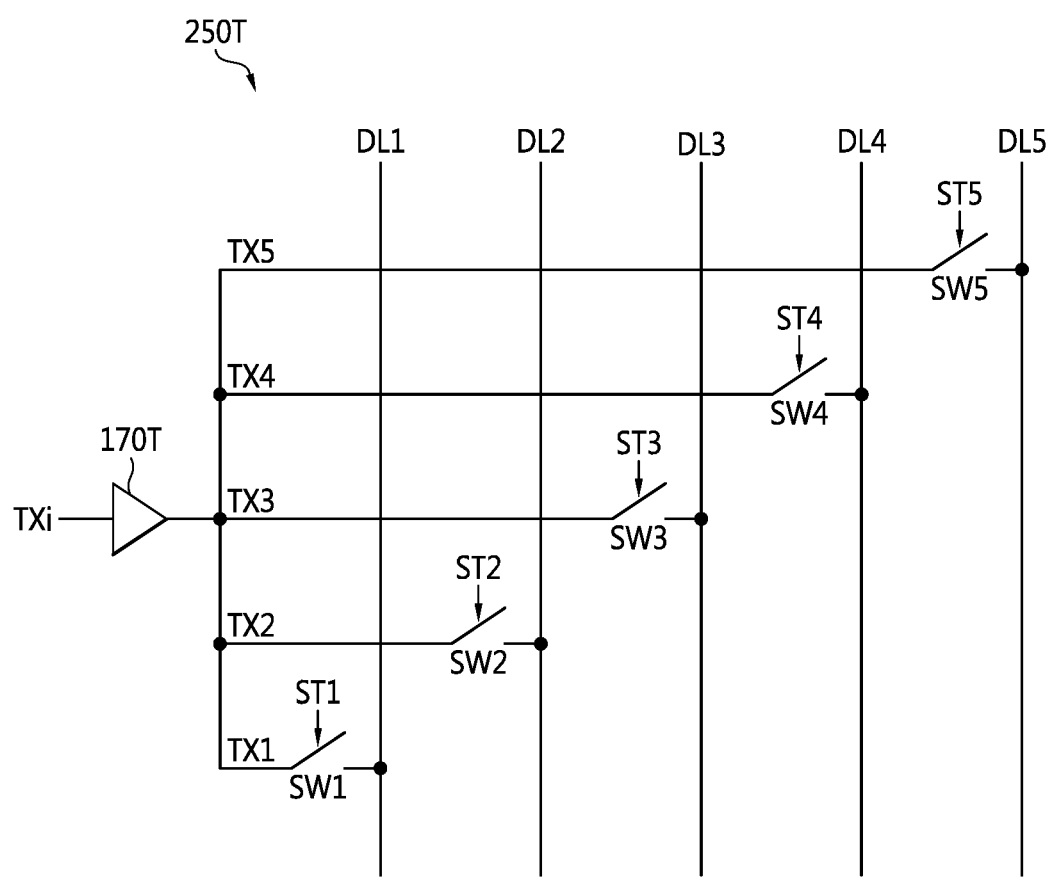
FIG. 9 is a circuit diagram of a first switch circuit shown in FIG. 8 according to an exemplary embodiment of the present inventive concept.
Figure 10:
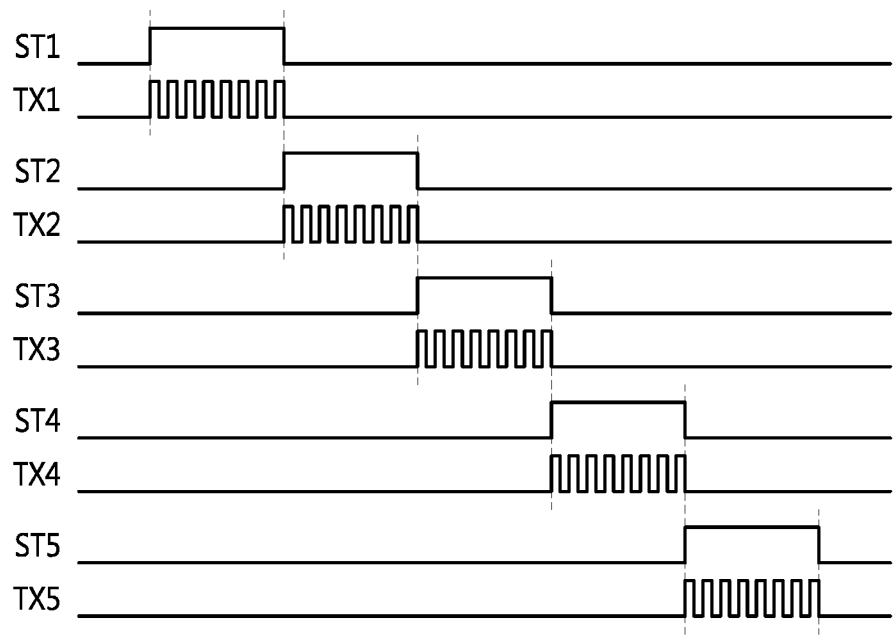
FIG. 10 is a timing diagram illustrating an operation of the first switch circuit shown in FIG. 9 according to an exemplary embodiment of the present inventive concept.
Figures 11, 12:
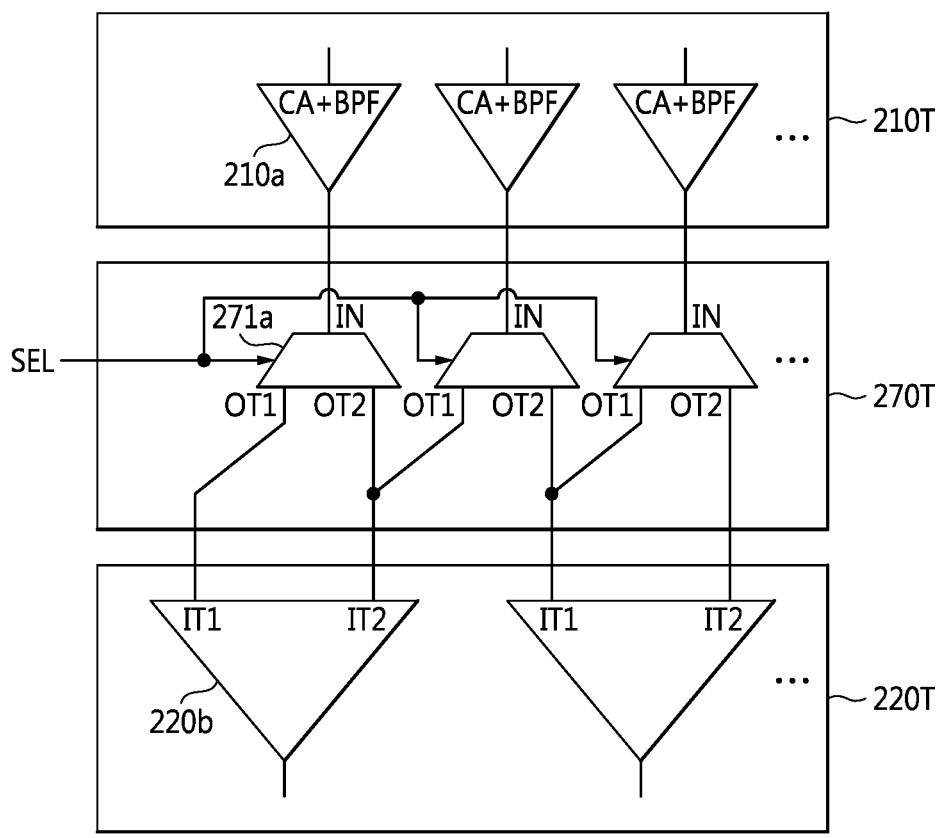
FIG. 11 is a table illustrating operations of a third switch circuit and a fourth switch circuit shown in FIG. 8 according to an exemplary embodiment of the present inventive concept.
FIG. 12 is a conceptual diagram illustrating an operation of a fifth switch circuit shown in FIG. 8 according to an exemplary embodiment of the present inventive concept.

FIG. 9 is a circuit diagram of the first switch circuit shown in FIG. 8 according to an exemplary embodiment of the inventive concept. FIG. 10 is a timing diagram illustrating an operation of the first switch circuit shown in FIG. 9 according to an exemplary embodiment of the inventive concept. FIG. 11 is a table illustrating operations of the third switch circuit and the fourth switch circuit shown in FIG. 8 according to an exemplary embodiment of the inventive concept.

Referring to FIG. 9, the first switch circuit 250T includes first to fifth switches SW1 to SW5. Each of the switches SW1 to SW5 is connected between an output terminal of the first driver 170T and one of the drive lines DL1 to DL5. The switches SW1 to SW5 are turned on or off in response to switch signals ST1 to ST5.

For example, when a first switch SW1 is turned on in response to a first switch signal ST1 activated to a high level in the transmit-to-receive mode (TX-to-RX), a first drive pulse TXi=TX1 is supplied to the first drive line DL1 through the first switch SW1. Each of drive pulses TX2, TX3, TX4, and TX5 is supplied to each of drive lines DL2, DL3, DL4, and DL5 through each of switches SW2, SW3, SW4, and SW5, which are turned on at different times. Since activation sections (also referred to as "on" sections) of the switches SW1 to SW5 are not overlapped with one another in terms of time, each of the drive pulses TX1 to TX5 is sequentially supplied to each of the drive lines DL1 to DL5 at a different time.

A structure and a timing diagram of the second switch circuit 250R are similar to the structure and the timing diagram of the first switch circuit 250T described with reference to FIGS. 9 and 10. Thus, a detailed description thereof is omitted.

Referring to the second switch circuit 250R, in the receive-to-transmit mode, each of drive signals TXi and TX1 to TX9 (similar to FIG. 9) is sequentially output through the second driver 170R, and is sequentially supplied to each of the sensing lines SL1 to SL9 through each of the switches SW1 to SW9 (similar to FIG. 9).

The third switch circuit 260T controls a connection between the first switch circuit 250T and the first circuit 210T in response to a transmission driver on signal TX_DRV_ON. The third switch circuit 260T includes a plurality of third switches 260a. Referring to FIG. 11, the transmission driver on signal TX_DRV_ON is deactivated in the transmit-to-receive mode TX-to-RX. Thus, each of the plurality of third switches 260a included in the third switch circuit 260T is turned off. In the receive-to-transmit mode RX-to-TX, each of the plurality of third switches 260a of the third switch circuit 260T is turned on since the transmission driver on signal TX_DRV_ON is activated.

The fourth switch circuit 260R controls a connection between the second switch circuit 250R and the second circuit 210R in response to the transmission driver on signal TX_DRV_ON. The fourth switch circuit 260R includes a plurality of fourth switches 260b. Referring to FIG. 11, since the transmission driver on signal TX_DRV_ON is deactivated in the transmit-to-receive mode TX-to-RX, each of the plurality of fourth switches 260b included in the fourth switch circuit 260R is turned on.

In the receive-to-transmit mode (RX-to-TX), since the transmission driver on signal TX_DRV_ON is activated, each of the plurality of fourth switches 260b of the fourth switch circuit 260R is turned off. The third switch circuit 260T and the fourth switch circuit 260R complementarily operate in response to the transmission driver on signal TX_DRV_ON. For example, when the third switch circuit 260T is in an off state, the fourth switch circuit 260R is in an on state, and when the third switch circuit 260T is in an on state, the fourth switch circuit 260R is in an off state.

The first circuit 210T includes amplifier circuits 210a. In an exemplary embodiment, referring to a sequential arrangement of the amplifier circuits 210a, odd-numbered amplifier circuits of the amplifier circuits 210a are the same as the first amplifier circuit 210-1 of FIG. 5, and even-numbered amplifier circuits of the amplifier circuits 210a are the same as the second amplifier 210-2 of FIG. 5.

The second circuit 210R includes amplifier circuits 210b. In an exemplary embodiment, referring to a sequential arrangement of the amplifier circuits 210b, odd-numbered amplifier circuits of the amplifier circuits 210b are the same as the first amplifier circuit 210-1 of FIG. 5, and even-numbered amplifier circuits of the amplifier circuits 210b are the same as the second amplifier 210-2 of FIG. 5.

FIG. 12 is a conceptual diagram illustrating an operation of the fifth switch circuit shown in FIG. 8 according to an exemplary embodiment of the inventive concept. Referring to FIGS. 8 and 12, the fifth switch circuit 270T includes a plurality of fifth switches 271a. Each of the plurality of fifth switches 271a includes an input terminal IN, a first output terminal OT1, and a second output terminal OT2.

The first output terminal OT1 of each of the fifth switches 271a is connected to a first input terminal IT1 of an amplifier circuit 220b, and a second output terminal OT2 of each of the fifth switches 271a is connected to a second input terminal IT2 of an amplifier circuit 220b. Each of the plurality of fifth switches 271a connects one of the first output terminal and the second output terminal with the input terminal in response to a selection signal SEL. Each of the plurality of fifth switches 271a may be, for example, a multiplexer. However, the fifth switches 271a are not limited thereto.

The sixth switch circuit 270R includes a plurality of sixth switches 271b. Each of the plurality of sixth switches 271b includes an input terminal, a first output terminal, and a second input terminal. Each of the plurality of sixth switches 271b connects one of the first output terminal and the second output terminal with the input terminal in response to a selection signal SEL. A structure of the sixth switches 271b is the same as a structure of the fifth switches 271a shown in FIG. 12.

The selection signal SEL is a signal used to select an odd-numbered differential pair or an even-numbered differential pair. Each of the switch circuits 270T and 270R performs an operation of selecting an odd-numbered differential pair shown in FIGS. 13 and 15 in response to a selection signal SEL having a first level (for example, a low level). Each of the switch circuits 270T and 270R performs an operation of selecting an even-numbered differential pair shown in FIGS. 14 and 16 in response to a selection signal SEL having a second level (for example, a low level).

The third circuit 220T includes a plurality of amplifier circuits 220a. A structure of each of the plurality of amplifier circuits 220a is the same as a structure of the third amplifier circuit 220 shown in FIG. 5.

The fourth circuit 220R includes a plurality of amplifier circuits 220b. A structure of each of the plurality of amplifier circuits 220b is the same as the structure of the third amplifier circuit 220 shown in FIG. 5.

The fifth circuit 232T includes a plurality of first processing circuits 232a. Each of the first processing circuits 232a includes the ADC 231, the first mixer 233, and the second mixer 235 of FIG. 5. The sixth circuit 232R includes a plurality of second processing circuits 232b. each of the second processing circuits 232b includes the ADC 231, the first mixer 233, and the second mixer 235 of FIG. 5.

The seventh circuit 236T includes a plurality of third processing circuits 236a. Each of the third processing circuits 236a may include the digital average circuits 237 and 239 of FIG. 5. According to exemplary embodiments, each of the third processing circuits 236a may further include the clock signal generator 240 and the DSP 290 of FIG. 5.

The eighth circuit 236R includes a plurality of fourth processing circuits 236b. Each of the fourth processing circuits 236b may include the digital average circuits 237 and 239 of FIG. 5. According to exemplary embodiments, each of the fourth processing circuits 236b may further include the clock signal generator 240 and the DSP 290 of FIG. 5.

According to exemplary embodiments, one clock signal generator 240 may be included in the AFE circuit 200. According to exemplary embodiments, a plurality of clock signal generators 240 may be included in the AFE circuit 200. For example, a clock signal generator 240 may be included for every two corresponding sensing lines.

Figure 13:
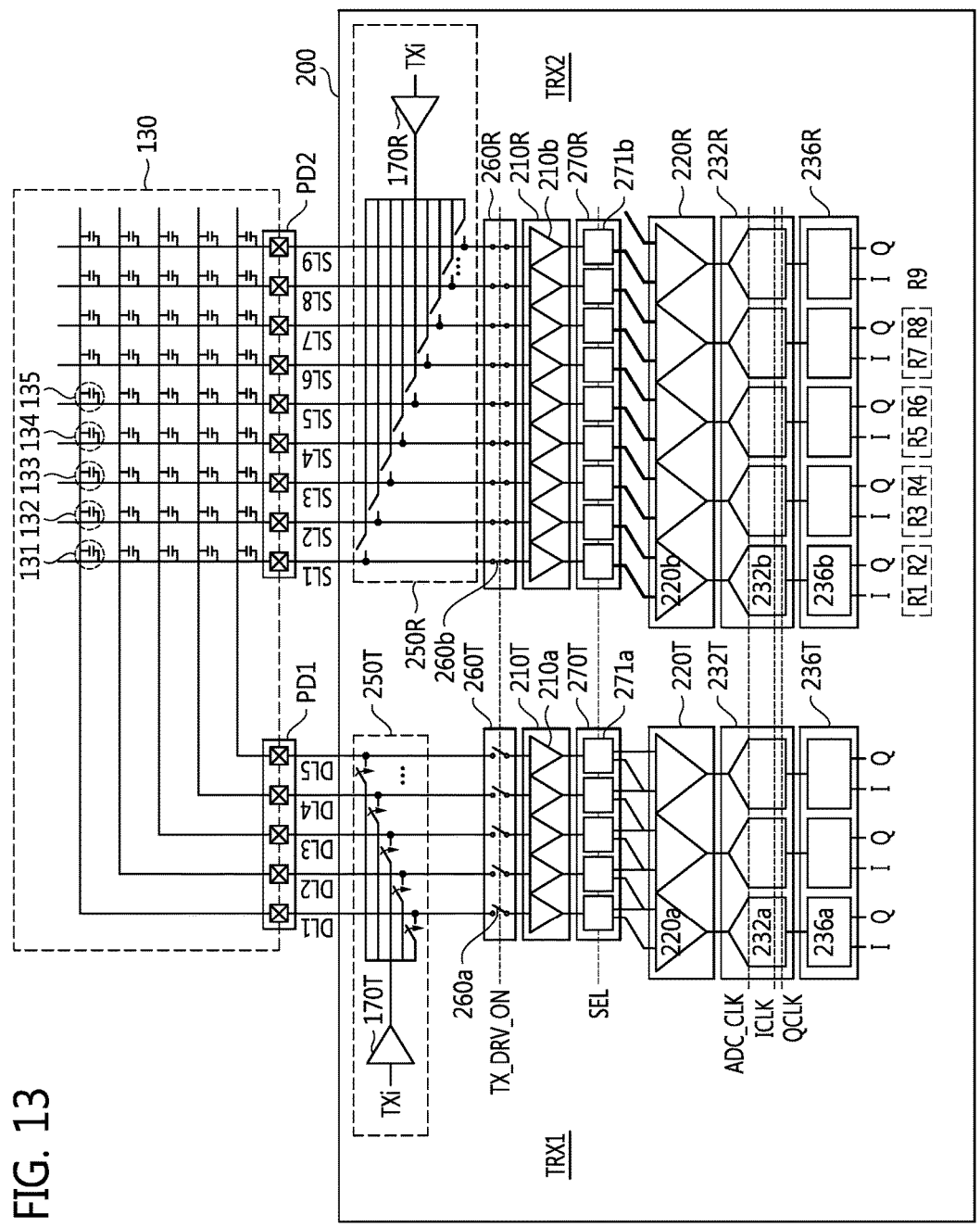
FIG. 13 is a conceptual diagram illustrating the operation of the analog front end circuit of FIG. 8, which uses odd-numbered differential pair and operates in a transmit-to-receive mode, according to an exemplary embodiment of the present inventive concept.

FIG. 13 is a conceptual diagram illustrating the operation of the analog front end circuit of FIG. 8, which uses odd-numbered differential pairs and operates in the transmit-to-receive mode, according to an exemplary embodiment of the inventive concept. The transmission driver on signal TX_DRV_ON is deactivated and a selection signal SEL has the first level in the transmit-to-receive mode.

In the transmit-to-receive mode, each of the first switches included in the first switch circuit 250T are sequentially turned on to sequentially transmit each of the drive signals TX1 to TX5 to each of the drive lines DL1 to DL5, all of the second switches included in the second switch circuit 250R are turned off, all of the third switches 260a included in the third switch circuit 260T are turned off, and all of the fourth switches 260b included in the fourth switch circuit 260R are turned on.

Each of the switches 271b transmits an output signal of each of the amplifier circuits 210b to each of the amplifier circuits 220b through the first output terminal OT1 in response to a selection signal SEL having the first level. Accordingly, each of the amplifier circuits 220b amplifies a difference between signals output from two corresponding switches 271b and performs band-pass filtering. Each of the fourth processing circuits 236b outputs a pair of an in-phase signal I and a quadrature-phase signal Q. The eighth circuit 236R generates output signals R1 to R9. According to the exemplary embodiment shown in FIG. 13, the fifth sequentially arranged fourth processing circuit of the fourth processing circuits 236b does not generate normal in-phase signals I and quadrature-phase signals Q.

Figure 14:
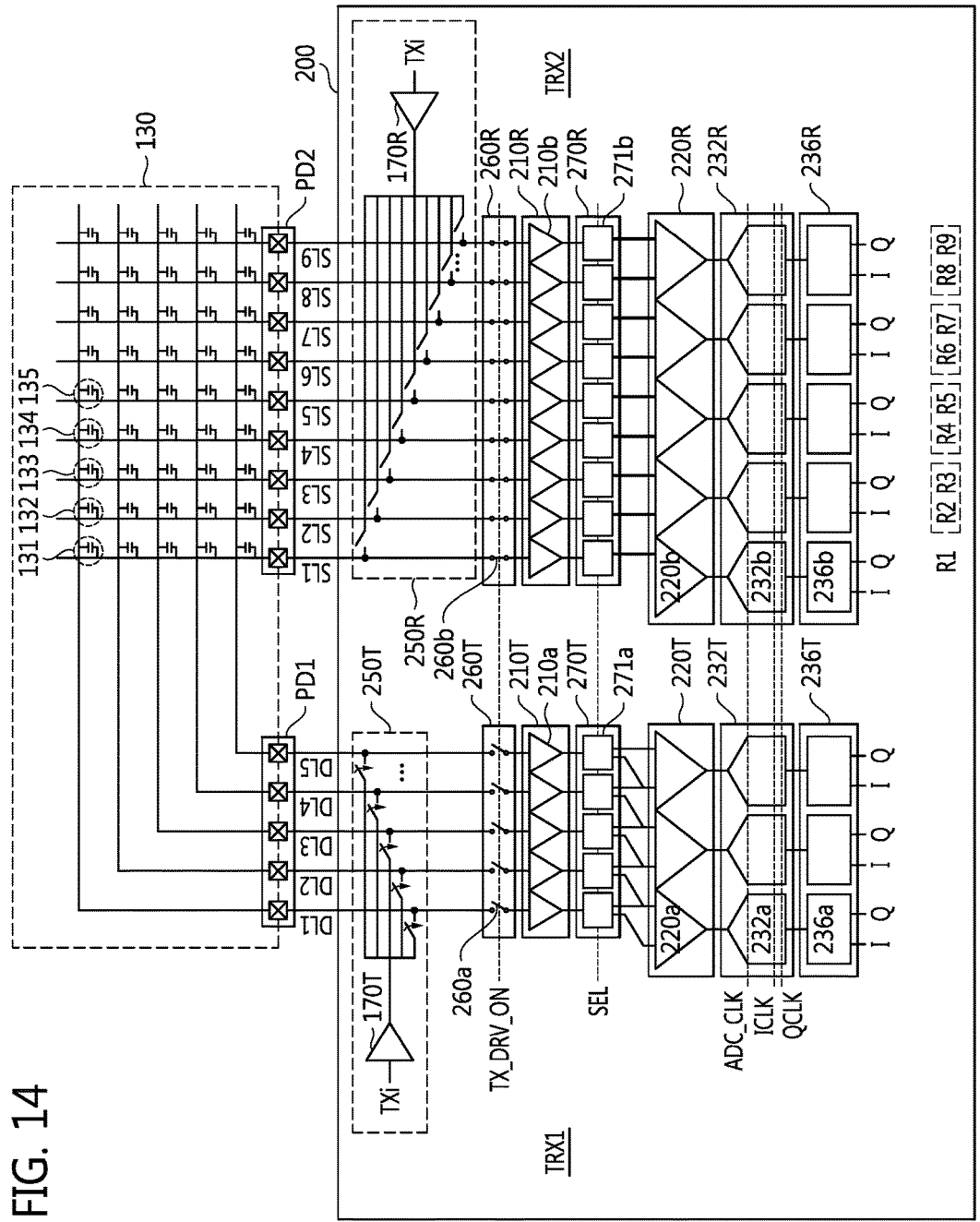
FIG. 14 is a conceptual diagram illustrating the operation of the analog front end circuit of FIG. 8, which uses even-numbered differential pairs and operates in the transmit-to-receive mode, according to an exemplary embodiment of the present inventive concept.

FIG. 14 is a conceptual diagram illustrating the operation of the analog front end circuit of FIG. 8, which uses even-numbered differential pairs and operates in the transmit-to-receive mode, according to an exemplary embodiment of the inventive concept.

The transmission driver on signal TX_DRV_ON is deactivated and a selection signal SEL has the second level in the transmit-to-receive mode.

In the transmit-to-receive mode, all of the first switches included in the first switch circuit 250T are sequentially turned on to sequentially transmit each of the drive signals TX1 to TX5 to each of the drive lines DL1 to DL5, all of the second switches included in the second switch circuit 250R are turned off, all of the third switches 260a included in the third switch circuit 260T are turned off, and all of the fourth switches 260b included in the fourth switch circuit 260R are turned on.

Each of the switches 271b transmits an output signal of each of the amplifier circuits 210b to each of the amplifier circuits 220b through the second output terminal OT2 in response to the selection signal SEL having the second level. Accordingly, each of the amplifier circuits 220b amplifies a difference between signals output from two corresponding switches 271b and performs band-pass filtering. Each of the fourth processing circuits 236b outputs a pair of an in-phase signal I and a quadrature-phase signal Q. The eighth circuit 236R generates output signals R2 to R9. According to an exemplary embodiment shown in FIG. 14, the first sequentially arranged fourth processing circuit of the fourth processing circuits 236b does not generate normal in-phase signals I and quadrature-phase signals Q.

Figure 15:
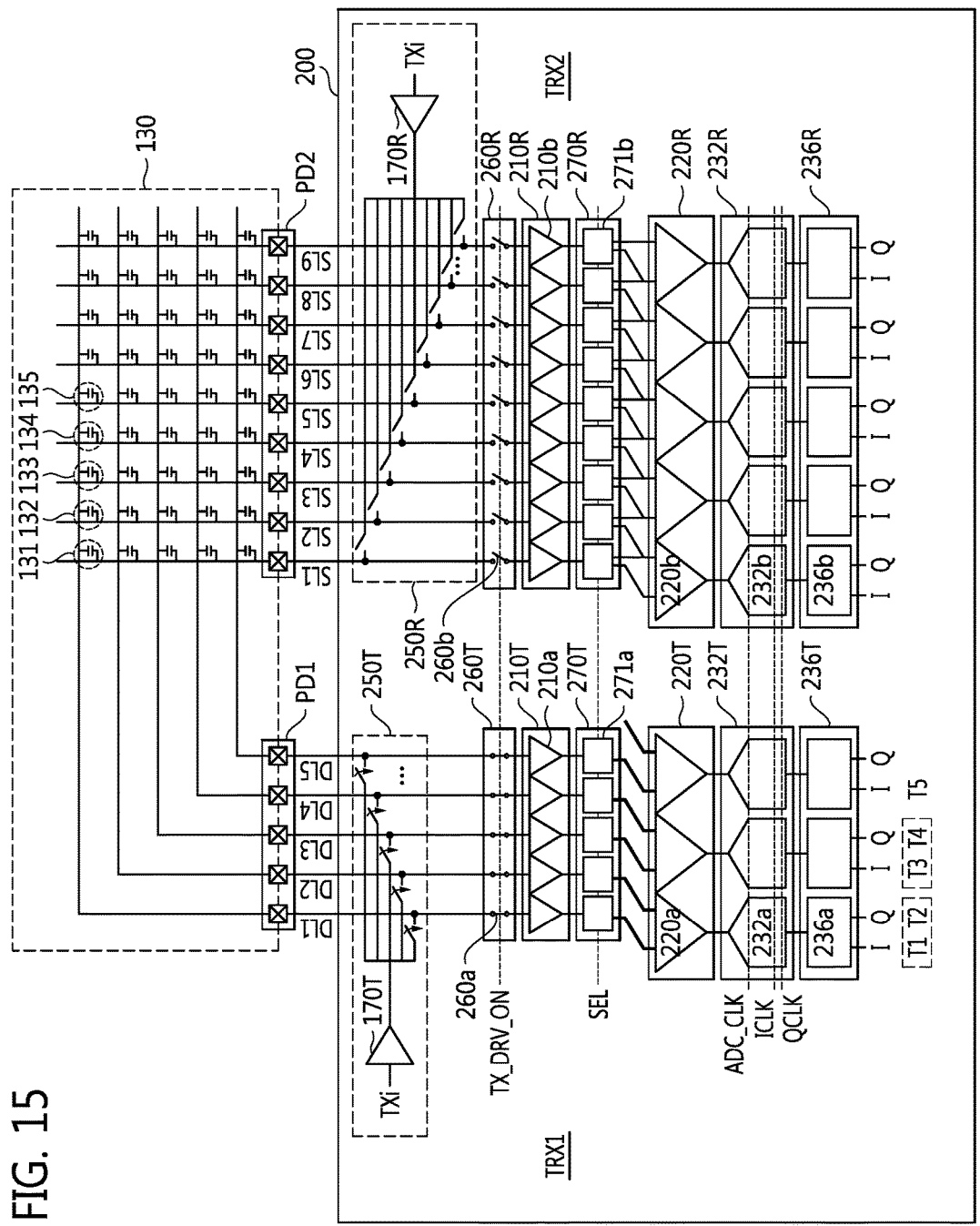
FIG. 15 is a conceptual diagram illustrating the operation of the analog front end circuit of FIG. 8, which uses the odd-numbered differential pairs and operates in a receive-to-transmit mode, according to an exemplary embodiment of the present inventive concept.

FIG. 15 is a conceptual diagram illustrating the operation of the analog front end circuit of FIG. 8, which uses odd-numbered differential pairs and operates in the receive-to-transmit mode, according to an exemplary embodiment of the inventive concept.

The transmission driver on signal TX_DRV_ON is activated and a selection signal SEL has the first level in the receive-to-transmit mode.

In the receive-to-transmit mode, all of the second switches included in the second switch circuit 250R are sequentially turned on to sequentially transmit each of the drive signals to each of the sensing lines SL1 to SL9, all of the first switches included in the first switch circuit 250T are turned off, all of the third switches 260a included in the third switch circuit 260T are turned on, and all of the fourth switches 260b included in the fourth switch circuit 260R are turned off.

Each of the switches 271a transmits an output signal of each of the amplifier circuits 210a to each of the amplifier circuits 220a through the first output terminal OT1 in response to the selection signal SEL having the first level. Accordingly, each of the amplifier circuits 220a amplifies a difference between signals output from two corresponding switches 271a and performs band-pass filtering. Each of the third processing circuits 236a outputs a pair of an in-phase signal I and a quadrature-phase signal Q. The seventh circuit 236T generates output signals T1 to T5. According to the exemplary embodiment shown in FIG. 15, the third sequentially arranged third processing circuit of the third processing circuits 236a does not generate normal in-phase signals I and quadrature-phase signals Q.

Figure 16:
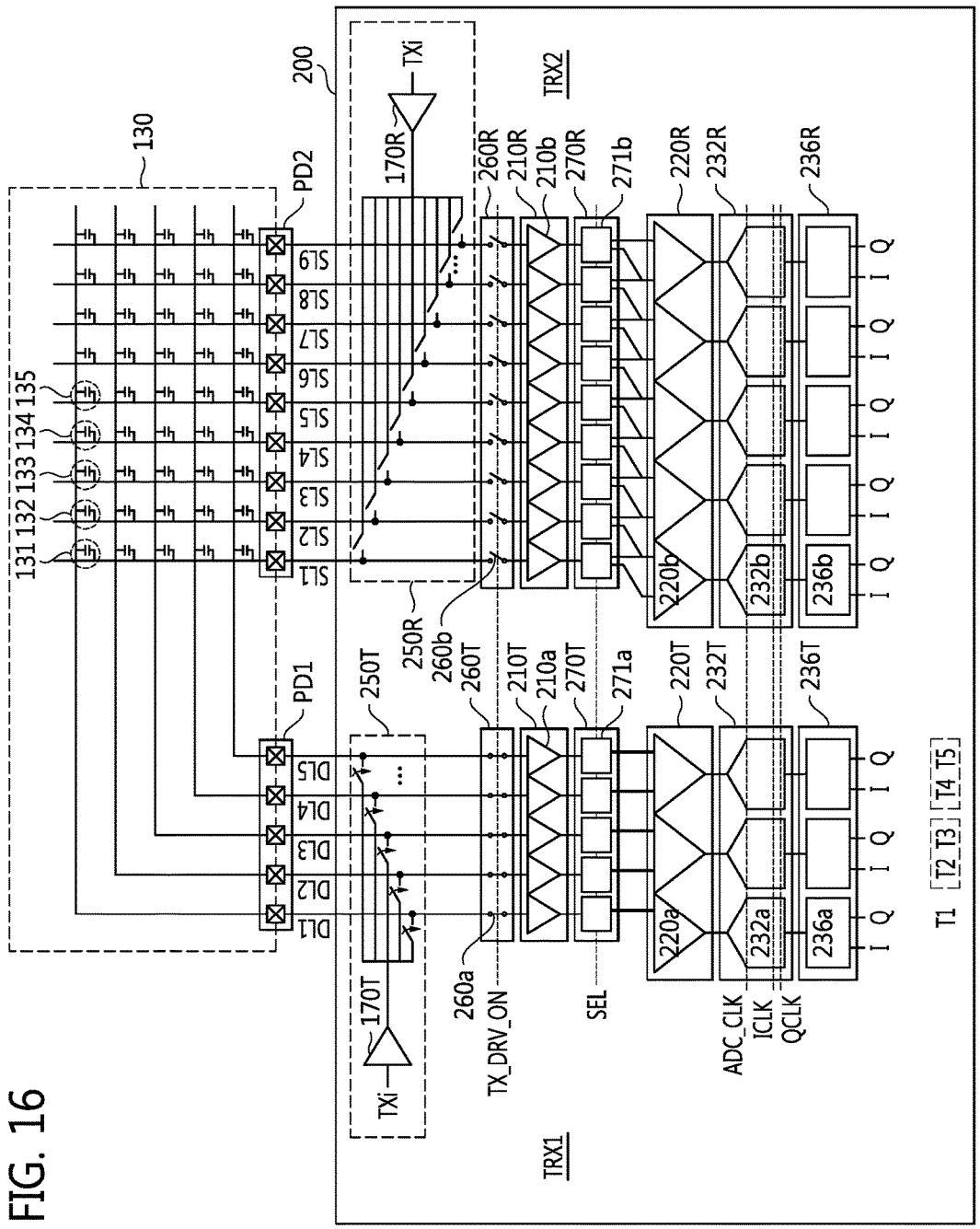
FIG. 16 is a conceptual diagram illustrating the operation of the analog front end circuit of FIG. 8, which uses the even-numbered differential pairs and operates in the receive-to-transmit mode, according to an exemplary embodiment of the present inventive concept.

FIG. 16 is a conceptual diagram illustrating the operation of the analog front end circuit of FIG. 8, which uses even-numbered differential pairs and operates in the receive-to-transmit mode, according to an exemplary embodiment of the inventive concept.

The transmission driver on signal TX_DRV_ON is activated and a selection signal SEL has the second level in the receive-to-transmit mode.

In the receive-to-transmit mode, all of the second switches included in the second switch circuit 250R are sequentially turned on to sequentially transmit each of the drive signals to each of the sensing lines SL1 to SL9, all of the first switches included in the first switch circuit 250T are turned off, all of the third switches 260a included in the third switch circuit 260T are turned on, and all of the fourth switches 260b included in the fourth switch circuit 260R are turned off.

Each of the switches 271a transmits an output signal of each of the amplifier circuits 210a to each of the amplifier circuits 220a through the second output terminal OT2 in response to the selection signal SEL having the second level. Accordingly, each of the amplifier circuits 220a amplifies the difference between signals output from two corresponding switches 271a and performs band-pass filtering. Each of the third processing circuits 236a outputs a pair of an in-phase signal I and a quadrature-phase signal Q. The seventh circuit 236T generates output signals T1 to T5. According to the exemplary embodiment shown in FIG. 16, the first sequentially arranged third processing circuit of the third processing circuits 236a does not generate normal in-phase signals I and quadrature-phase signals Q.

Figure 17:
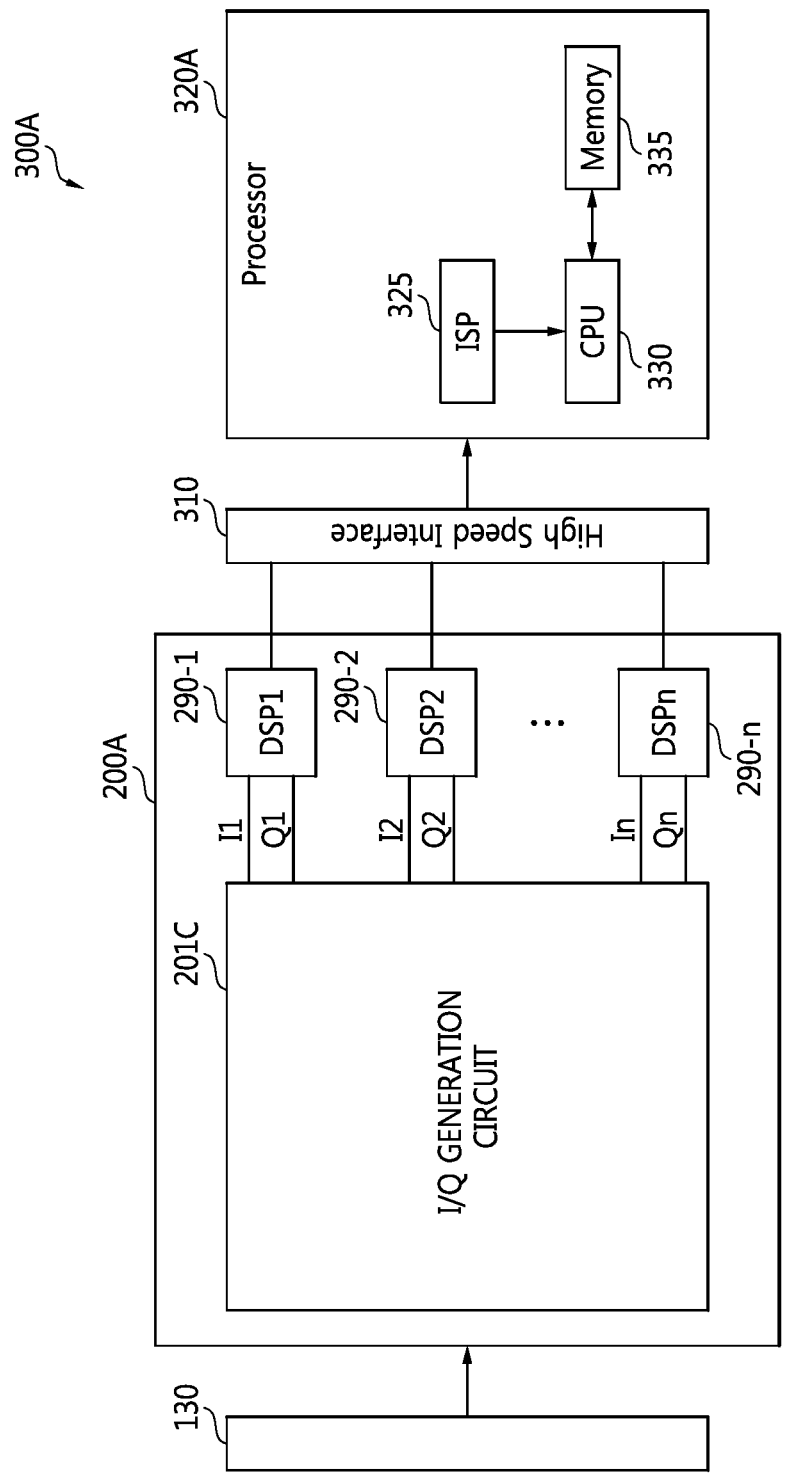
FIGS. 17 to 19 are block diagrams of mobile systems including a fingerprint sensor and a fingerprint analog front end circuit, according to exemplary embodiments of the present inventive concept.
Figure 18:
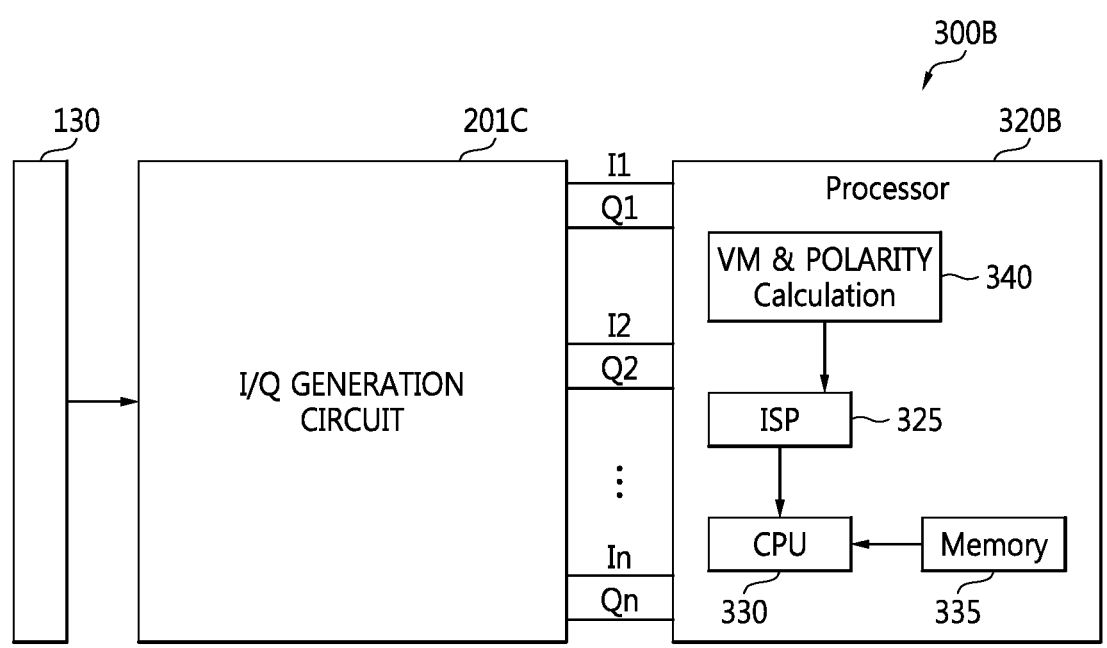
Figure 19:
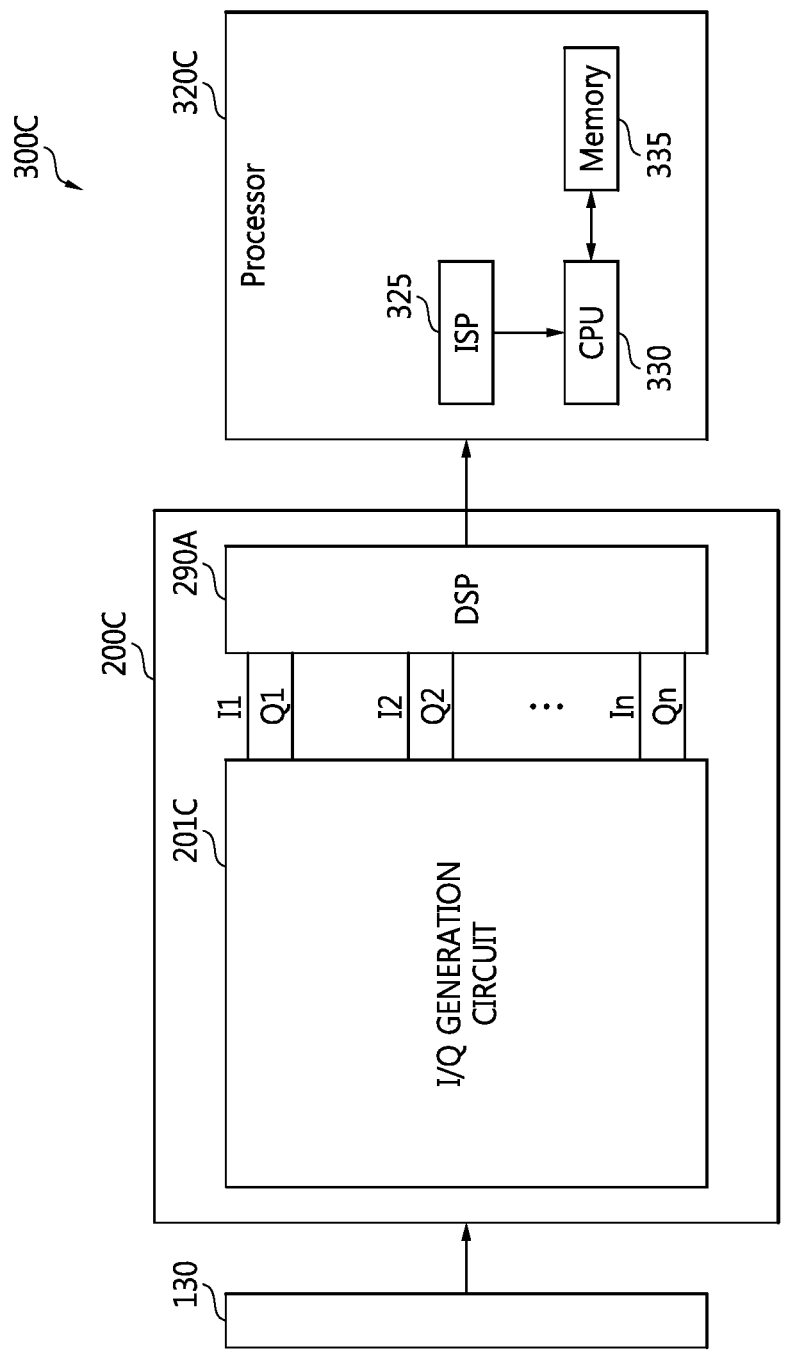

FIGS. 17 to 19 are block diagrams of mobile systems including a fingerprint sensor and a fingerprint analog front end circuit, according to exemplary embodiments of the inventive concept.

Referring to FIG. 17, a mobile device 300A includes the fingerprint sensor 130, an AFE circuit 200A, a high-speed interface 310, and a processor 320A. The AFE circuit 200A includes an I/Q generation circuit 201C and a plurality of DSPs 290-1 to 290-n.

The I/Q generation circuit 201C includes a plurality of I/Q generators. A structure of each of the plurality of I/Q generators may be the same as the structure of the I/Q generator 201 shown in FIG. 5. Each of the I/Q generators may process an output signal (output charge) of each of two corresponding sensing lines, and generate each of in-phase signals I1 to In and each of quadrature-phase signals Q1 to Qn according to a result of the processing. Each of the DSPs 290-1 to 290-n may process signal pairs (I1 and Q1 to In and Qn) output from each of the I/Q generators.

Each of the DSPs 290-1 to 290-n may calculate a vector magnitude and a polarity using each of the signal pairs (I1 and Q1 to In and Qn). The vector magnitudes and polarities calculated by the DSPs 290-1 to 290-n may be transmitted to the processor 320A through the high-speed interface 310.

The high-speed interface 310 may refer to, for example, a high-speed serial interface (e.g., a MIPI interface). However, the high-speed interface 310 is not limited thereto.

In an exemplary embodiment, the processor 320A includes an image signal processor (ISP) 325, a CPU 330, and a memory device 335.

The ISP 325 may restore or generate a fingerprint image using vector magnitudes and polarities transmitted from the AFE circuit 200A. The memory device 335 may store a program and/or data necessary for an operation of the processor 320A. For example, a fingerprint image of a user may be stored in the memory device 335 according to a control of the CPU 330. The CPU 330 may authenticate a user of the mobile device 300A based on whether the fingerprint image restored by the ISP 325 matches the fingerprint image stored in the memory device 335.

Referring to FIG. 18, in an exemplary embodiment, a mobile device 300B includes the fingerprint sensor 130, the I/Q generation circuit 201C, and a processor 320B. The I/Q generation circuit 201C includes a plurality of I/Q generators. A structure of each of the plurality of I/Q generators is the same as the structure of the I/Q generator 201 shown in FIG. 5.

Each of the I/Q generators may process an output signal (output charge) of each of two corresponding sensing lines, and generate each of the in-phase signals I1 to In and each of the quadrature-phase signals Q1 to Qn according to a result of the processing. The in-phase signals I1 to In and the quadrature-phase signals Q1 to Qn may be transmitted to the processor 320B. In an exemplary embodiment, the high-speed interface 310 described with reference to FIG. 17 may be disposed between the I/Q generation circuit 201C and the processor 320B.

The processor 320B may include a vector magnitude and polarity calculator 340, the ISP 325, the CPU 330, and the memory device 335. The vector magnitude and polarity calculator 340 may calculate each vector magnitude and each polarity using each of the signal pairs I1 and Q1 to In and Qn provided from the I/Q generation circuit 201C. As described above, the polarity may be determined by a sign of the value of cos θ or a sign of the value of the in-phase signal I.

The ISP 325 may restore or generate a fingerprint image using vector magnitudes and polarities transmitted from the vector magnitude and polarity calculator 340. The CPU 330 may authenticate a user of the mobile device 300B based on whether the fingerprint image restored by the ISP 325 matches the fingerprint image stored in the memory device 335.

Referring to FIG. 19, a mobile device 300C includes the fingerprint sensor 130, an AFE circuit 200C, and a processor 320C. The AFE circuit 200C includes the I/Q generation circuit 201C and a DSP 290A.

The I/Q generation circuit 201C includes a plurality of I/Q generators. A structure of each of the plurality of I/Q generators is the same as the structure of the I/Q generator 201 shown in FIG. 5. Each of the I/Q generators may process an output signal (output charge) of each of two corresponding sensing lines, and generate each of the in-phase signals I1 to In and each of the quadrature-phase signals Q1 to Qn according to a result of the processing. The DSP 290A may process signal pairs (I1 and Q1 to In and Qn) output from each of the I/Q generators.

The DSP 290A may calculate each vector magnitude and each polarity using each of the signal pairs I1 and Q1 to In and Qn. The vector magnitudes and polarities calculated by the DSP 290A may be transmitted to the processor 320C. In an exemplary embodiment, the high-speed interface 310 described with reference to FIG. 17 may be disposed between the AFE circuit 200C and the processor 320C.

In an exemplary embodiment, the processor 320C includes the ISP 325, the CPU 330, and the memory device 335.

Figure 20:
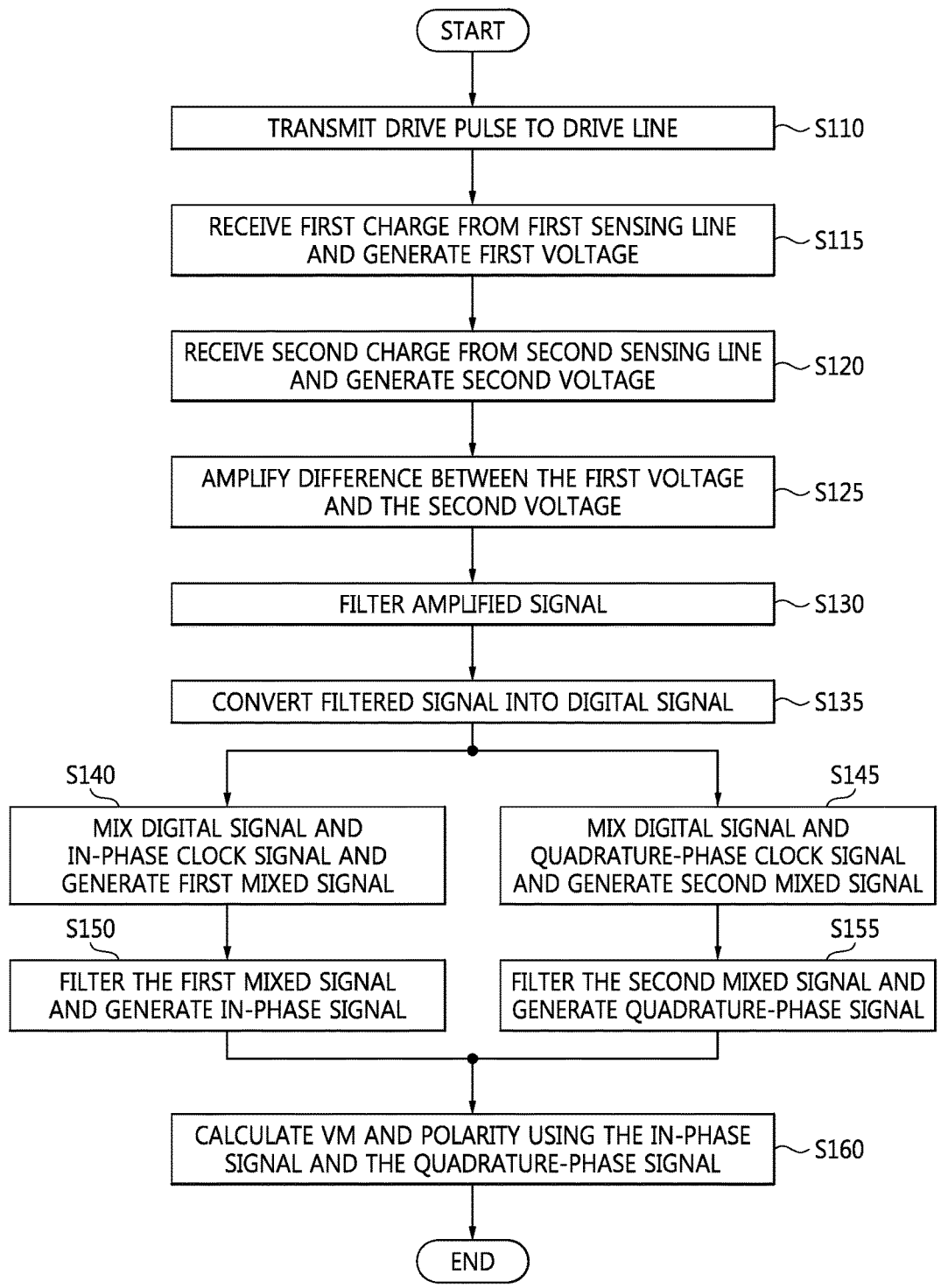
FIG. 20 is a flowchart illustrating the operation of the analog front end circuit shown in FIG. 5 according to an exemplary embodiment of the present inventive concept.

FIG. 20 is a flowchart illustrating an operation of the analog front end circuit shown in FIG. 5 according to an exemplary embodiment of the inventive concept. Referring to FIGS. 1 to 20, the drive lines DL1 to DL5 sequentially transmit each drive pulse TXi provided by the AFE circuit 200 to the fingerprint sensor 130 in the transmit-to-receive mode (S110). The AFE circuit 200 generates in-phase signals and quadrature-phase signals by processing charges received through each of the sensing lines SL1 to SL9.

The sensing lines SL1 to SL9 sequentially transmit each drive pulse TXi provided by the AFE circuit 200 to the fingerprint sensor 130 in the receive-to-transmit mode (S110). The AFE circuit 200 generates in-phase signals and quadrature-phase signals by processing charges received through each of the drive lines DL1 to DL5.

Each of the drive lines DL1 to DL5 is used as a drive line and each of the sensing lines SL1 to SL9 is used as a sensing line in the transmit-to-receive mode. Each of the sensing lines SL1 to SL9 is used as a drive line and each of the drive lines DL1 to DL5 is used as a sensing line in the receive-to-transmit mode.

In an exemplary embodiment, the fingerprint sensor 130 transmits charges to the AFE circuit 200 line by line from top to bottom and from left to right sequentially.

Each of the I/Q generators includes a first sensing line and a second sensing line. The first amplifier circuit 210-1 converts a first charge provided from the first sensing line into a first voltage V1 (S115). The first voltage V1 may be an output voltage of the first band-pass filter 213-1.

The second amplifier circuit 210-2 converts a second charge provided from the second sensing line into a second voltage V2 (S120). The second voltage V2 may be an output voltage of the second band-pass filter 213-2. Operations S115 and S120 may be performed at substantially the same time (e.g., operations S115 and S120 may be performed in parallel).

The third amplifier circuit 220 amplifies the difference between the first voltage V1 and the second voltage V2 (S125). The third amplifier circuit 220 filters an amplified voltage using at least one of the band-pass filters 221-2 and 223-2 (S130). The ADC 231 converts a filtered signal V3 into a digital signal DS (S135).

The first mixer 233 mixes the digital signal DS and the in-phase clock signal ICLK and generates a first mixed signal M1 (S140). The second mixer 235 mixes the digital signal DS and the quadrature-phase clock signal QCLK and generates a second mixed signal M2 (S145). Operations S140 and 145 may be performed at substantially the same time (e.g., operations S140 and S145 may be performed in parallel).

The first digital average filter 237 calculates an average value of the first mixed signal M1 and outputs the average value as the in-phase signal I (S150). The second digital average filter 239 calculates an average value of the second mixed signal M2 and outputs the average value as the quadrature-phase signal Q (S155). Each of the digital average filters 237 and 239 may be embodied in, for example, each low-pass filter. Each low-pass filter may perform low-pass filtering on each of the mixed signals M1 and M2 and generate each of the DC signals I and Q.

The DSP 290 calculates a vector magnitude VM and a polarity using the in-phase signal I and the quadrature-phase signal Q (S160). According to exemplary embodiments, the DSP may include a plurality of DSPs corresponding to each I/Q generator as shown in FIG. 17, or the DSP may be a single DSP that is commonly used by all I/Q generators as shown in FIG. 19.

According to an exemplary embodiment of the present inventive concept, a sensor read-out circuit that reads out output signals of a fingerprint sensor disposed underneath a cover glass can read a small mutual capacitance value at high accuracy.

According to an exemplary embodiment of the present inventive concept, the sensor readout circuit uses an analog circuit of a continuous circuit structure, which does not require switching at a front end thereof. As a result, switch noises do not flow toward the fingerprint sensor. According to an exemplary embodiment of the present inventive concept, the sensor readout circuit uses a lock-in amplifier of a digital method at a back end, thereby removing additional external capacitance for a low-pass filter compared to an analog circuit method.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A sensor read-out circuit, comprising:
   a first amplifier circuit that converts a first charge output from a first sensing line of a sensor into a first voltage;
   a second amplifier circuit that converts a second charge output from a second sensing line of the sensor into a second voltage;
   a third amplifier circuit that generates a first amplified voltage by amplifing a difference between the first voltage and the second voltage;
   a first analog-to-digital converter that converts the first amplified voltage into a first digital signal;
   a first mixer that generates a first mixed signal by mixing the first digital signal and an in-phase clock signal;
   a second mixer that generates a second mixed signal by mixing the first digital signal and a quadrature-phase clock signal;
   a first filter that generates a first in-phase signal by performing low-pass filtering on the first mixed signal; and
   a second filter that generates a first quadrature-phase signal by performing low-pass filtering on the second mixed signal.

2. The sensor read-out circuit of claim 1, wherein the first amplifier circuit comprises:
   a first charge amplifier that amplifies the first charge; and
   a first band-pass filter connected to an output terminal of the first charge amplifier, wherein the first band-pass filter outputs the first voltage,
   wherein the second amplifier circuit comprises:
   a second charge amplifier that amplifies the second charge; and
   a second band-pass filter connected to an output terminal of the second charge amplifier, wherein the second band-pass filter outputs the second voltage.

3. The sensor read-out circuit of claim 1, wherein the third amplifier circuit comprises:
   an amplifier that amplifies the difference between the first voltage and the second voltage; and
   a band-pass filter connected to an output terminal of the amplifier, wherein the band-pass filter outputs the first amplified voltage.

4. The sensor read-out circuit of claim 1, wherein the third amplifier circuit comprises:
   a first amplifier that amplifies the difference between the first voltage and the second voltage;
   a first band-pass filter connected to an output terminal of the first amplifier;
   a second amplifier connected to an output terminal of the first band-pass filter; and a second band-pass filter connected to an output terminal of the second amplifier, wherein the second band-pass filter outputs the first amplified voltage.

5. The sensor read-out circuit of claim 4, wherein a level of a second common mode voltage of the second band-pass filter is lower than a level of a first common mode voltage of the first band-pass filter.

6. The sensor read-out circuit of claim 1. further comprising:
a clock signal generator that generates the in-phase clock signal and the quadrature-phase clock signal; and
a driver that generates a drive pulse by buffering the in-phase clock signal, and supplies the drive pulse to a drive line of the sensor.

7. The sensor read-out circuit of claim 1, wherein a sampling frequency of the first analog-to-digital converter is higher than a frequency of the in-phase clock signal.

8. The sensor read-out circuit of claim 1, further comprising:
a digital signal processor that calculates a vector magnitude and a polarity based on the first in-phase signal and the first quadrature-phase signal.

9. The sensor read-out circuit of claim 1, further comprising:
a fourth amplifier circuit that converts a third charge output from a third sensing line of the sensor into a third voltage;
a fifth amplifier circuit that generates a second amplified voltage by amplifying a difference between the second voltage and the third voltage; and
a switch circuit that transmits the first voltage and the second voltage to the third amplifier circuit or transmits the second voltage and the third voltage to the fifth amplifier circuit in response to a selection signal,
wherein the first sensing line, the second sensing line, and the third sensing line are sequentially arranged.

10. The sensor read-out circuit of claim 9, further comprising:
a second analog-to-digital converter that converts the second amplified voltage into a second digital signal;
a third mixer that generates a third mixed signal by mixing the second digital signal and the in-phase clock signal;
a fourth mixer that generates a fourth mixed signal by mixing the second digital signal and the quadrature-phase clock signal;
a third filter that generates a second in-phase signal by performing low-pass filtering on the third mixed signal; and
a fourth filter that generates a second quadrature-phase signal by performing low-pass filtering on the fourth mixed signal.

11. A sensor read-out circuit, comprising:
an analog circuit that converts and amplifies a difference between a first mutual capacitance value of a first sensing line connected to a sensor and a second mutual capacitance value of a second sensing line connected to the sensor, and generates a band-pass filtered voltage by performing band-pass filtering on an amplified voltage;
an analog-to-digital converter that converts the band-pass filtered voltage into a digital signal;
a first mixer that generates a first mixed signal by mixing the digital signal and an in-phase clock signal;
a second mixer that generates a second mixed signal by mixing the digital signal and a quadrature-phase clock signal;

a first filter that generates an in-phase signal by performing low-pass filtering on the first mixed signal; and
a second filter that generates a quadrature-phase signal by performing low-pass filtering on the second mixed signal.

12. The sensor read-out circuit of claim 11, wherein the analog circuit comprises:
a first amplifier circuit that converts a first charge corresponding to the first mutual capacitance value into a first voltage;
a second amplifier circuit that converts a second charge corresponding to the second mutual capacitance value into a second voltage;
a first amplifier that amplifies a difference between the first voltage and the second voltage; and
a first band-pass filter that generates the band-pass filtered voltage based on an output voltage of the first amplifier.

13. The sensor read-out circuit of claim 12, further comprising:
a second band-pass filter; and
a second amplifier,
wherein the second band-pass filter and the second amplifier are connected in series between an output terminal of the first amplifier and an output terminal of the first band-pass filter.

14. The sensor read-out circuit of claim 13, wherein a level of a common mode voltage of the first band-pass filter is lower than a level of a common mode voltage of the second band-pass filter.

15. The sensor read-out circuit of claim 11, wherein a sampling frequency of the analog-to-digital converter is higher than a frequency of the in-phase clock signal.

16. A fingerprint sensing system, comprising:
a fingerprint sensor; and
a sensor read-out circuit that reads out output signals of the fingerprint sensor, wherein the fingerprint sensor comprises:
a first sensing element connected between a drive line and a first sensing line;
a second sensing element connected between the drive line and a second sensing line; and
a third sensing element connected between the drive line and a third sensing line, wherein the sensor read-out circuit comprises:
a first amplifier circuit that converts a first charge output from the first sensing line into a first voltage;
a second amplifier circuit that converts a second charge output from the second sensing line into a second voltage;
a third amplifier circuit that generates a first amplified voltage by amplifying a difference between the first voltage and the second voltage;
a first analog-to-digital converter that converts the first amplified voltage into a first digital signal;
a first mixer that generates a first mixed signal by mixing the first digital signal and an in-phase clock signal;
a second mixer that generates a second mixed signal by mixing the first digital signal and a quadrature-phase clock signal;
a first filter that generates a first in-phase signal by performing low-pass filtering on the first mixed signal: and
a second filter that generates a first quadrature-phase signal by performing low-pass filtering on the second mixed signal.

17. The fingerprint sensing system of claim 16, Wherein the first amplifier circuit comprises:

a first charge amplifier that amplifies the first charge; and a first band-pass filter connected to an output terminal of the first charge amplifier, wherein the first band-pass filter outputs the first voltage, wherein the second amplifier circuit comprises:

a second charge amplifier that amplifies the second charge; and a second band-pass filter connected to an output terminal of the second charge amplifier, wherein the second band-pass filter outputs the second voltage.

18. The fingerprint sensing system of claim 16, wherein the third amplifier circuit comprises:

a first amplifier that amplifies the difference between the first voltage and the second voltage;

a first band-pass filter connected to art output terminal of the first amplifier;

a second amplifier connected to an output terminal of the first band-pass filter; and a second band-pass filter connected to an output terminal of the second amplifier, wherein the second band-pass filter outputs the first amplified voltage.

19. The fingerprint sensing system of claim 16, further comprising:

a digital signal processor that calculates a vector magnitude and a polarity based on the first in-phase signal and the first quadrature-phase signal.

20. The fingerprint sensing system of claim 16, wherein the sensor read-out circuit further comprises:

a fourth amplifier circuit that converts a third charge output from the third sensing line into a third voltage;

a fifth amplifier circuit that generates a second amplified signal by amplifying difference between the second voltage and the third voltage; and a switch circuit that transmits the first voltage and the second voltage to the third amplifier circuit or transmits the second voltage and the third voltage to the fifth amplifier circuit in response to a selection signal.

* * * * *